(12) United States Patent
Watson

(10) Patent No.: US 8,608,383 B2
(45) Date of Patent: Dec. 17, 2013

(54) SYSTEM FOR HOLDING A LINEAR MOTION GUIDE TRACK TO A SUPPORT BASE AND METHOD THEREFOR

(75) Inventor: Nigel S. Watson, Martinez, CA (US)

(73) Assignee: Bishop-Wisecarver Corporation, Pittsburg, CA (US)

( * ) Notice: Subject to any disclaimer, the term of this patent is extended or adjusted under 35 U.S.C. 154(b) by 460 days.

(21) Appl. No.: 12/939,804

(22) Filed: Nov. 4, 2010

(65) Prior Publication Data

US 2011/0110616 A1    May 12, 2011

Related U.S. Application Data

(63) Continuation-in-part of application No. 12/643,785, filed on Dec. 21, 2009, now Pat. No. 8,434,946, which is a continuation-in-part of application No. 12/260,754, filed on Oct. 29, 2008, now Pat. No. 8,491,193.

(51) Int. Cl.
    *F16C 19/00* (2006.01)

(52) U.S. Cl.
    USPC .............................................. 384/55; 384/58

(58) Field of Classification Search
    USPC ......... 384/50, 53–55, 57–59; 403/373, 374.1, 403/381; 248/307, 313
    See application file for complete search history.

(56) References Cited

U.S. PATENT DOCUMENTS

| | | |
|---|---|---|
| 1,470,090 A | 10/1923 | Manning |
| 1,500,118 A | 7/1924 | Ellis |
| 3,210,716 A | 10/1965 | Meacham |
| 3,416,282 A | 12/1968 | Daugherty |
| 3,461,466 A | 8/1969 | Stahlhut et al. |
| 3,661,431 A | 5/1972 | Wisecarver |
| 3,848,388 A | 11/1974 | Bretche |
| 3,893,271 A | 7/1975 | Kotlarz |
| 4,057,312 A | 11/1977 | Hagermo |
| 4,497,148 A | 2/1985 | Lopez |
| 4,694,531 A | 9/1987 | Foy |
| 4,826,438 A | 5/1989 | Torres |
| 5,145,418 A | 9/1992 | Moranski et al. |
| 5,482,026 A | 1/1996 | Russell |

(Continued)

FOREIGN PATENT DOCUMENTS

| | | |
|---|---|---|
| DE | 4109286 C2 | 10/1994 |
| EP | 0258714 B1 | 6/1990 |
| WO | WO-02/038473 | 5/2002 |
| WO | 2011087468 | 7/2011 |

OTHER PUBLICATIONS

"DualVee Motion Technology", Catalog: Components, Technical Specifications, Aug. 2007, 32 pages.

(Continued)

*Primary Examiner* — James Pilkington
(74) *Attorney, Agent, or Firm* — Brian Beverly; Beeson Skinner Beverly, LLP

(57) ABSTRACT

A system for securing a linear motion guide track (1010) to a support extrusion (1030) comprises an elongated wedge (1040) having a protrusion configured for insertion in a slit in one side of the well of the support extrusion for positioning the wedge in the well, the wedge having deformable teeth on a side opposite the protrusion such that insertion of the guide track in the well deforms the teeth of the wedge thereby securely holding the guide track in the support extrusion.

19 Claims, 22 Drawing Sheets

(56) References Cited

U.S. PATENT DOCUMENTS

| | | |
|---|---|---|
| 5,513,916 A | 5/1996 | Takei |
| 5,553,947 A | 9/1996 | Scheib et al. |
| 5,794,901 A | 8/1998 | Sigel |
| 5,833,417 A | 11/1998 | Sargent et al. |
| 5,950,773 A | 9/1999 | Ito |
| 6,484,997 B1 | 11/2002 | Edwards et al. |
| 6,634,149 B2 | 10/2003 | Cates et al. |
| 6,746,055 B1 | 6/2004 | Wood et al. |
| 6,993,875 B2 * | 2/2006 | Rudduck ................... 52/474 |
| 7,163,178 B2 | 1/2007 | Ricaud |
| 2008/0112656 A1 | 5/2008 | Shirai et al. |
| 2009/0226122 A1 | 9/2009 | Schroeder |

OTHER PUBLICATIONS

Integral V Linear Guide: Snap-In Series; Jul. 18, 2008; PBC Linear, 2 pages.

Industrial Profile Systems, Catalog 1816, Linear Applications; 2002; Parker Automation, Parker Hannifin Corporation, pp. 148-173.

International Search Report and Written Opinion, mailed Apr. 13, 2010, for related PCT application No. PCT/US2009/069289, 9 pages.

\* cited by examiner

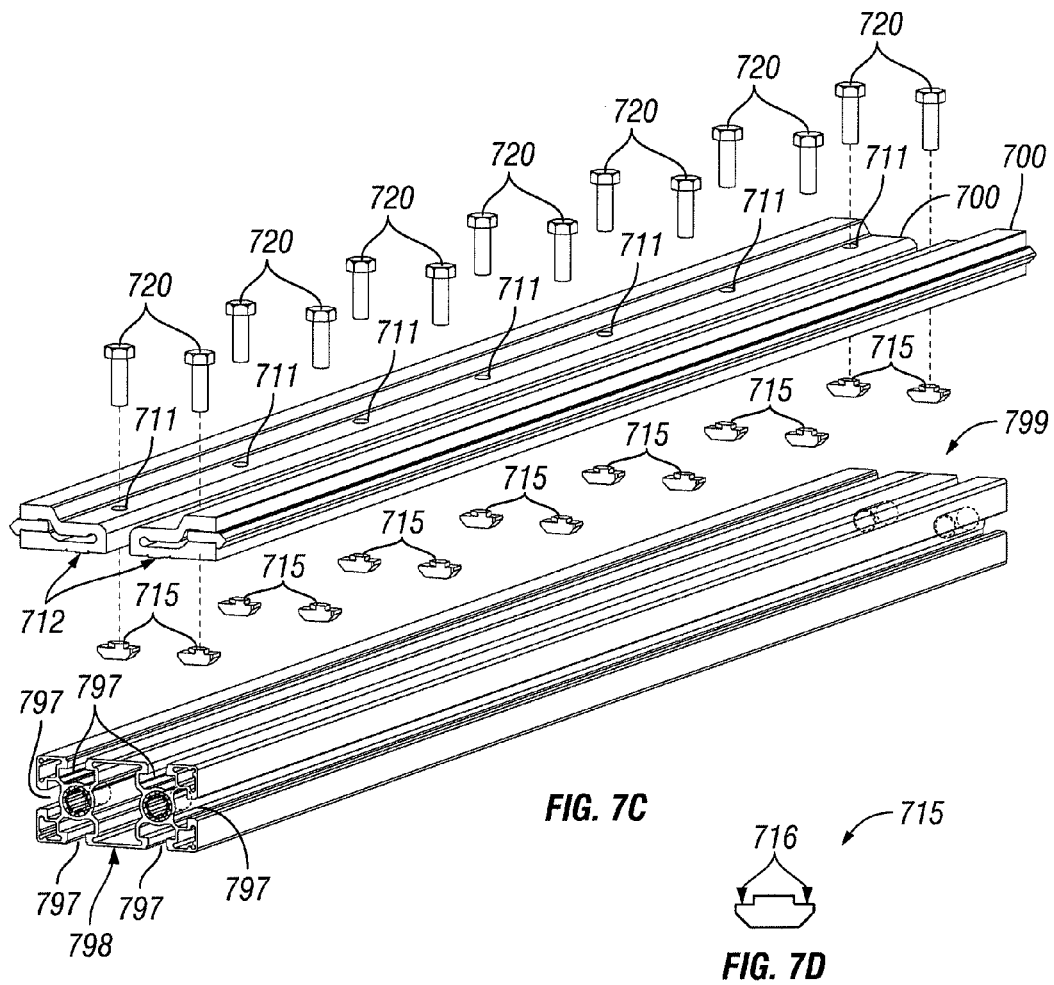
FIG. 7C
FIG. 7D
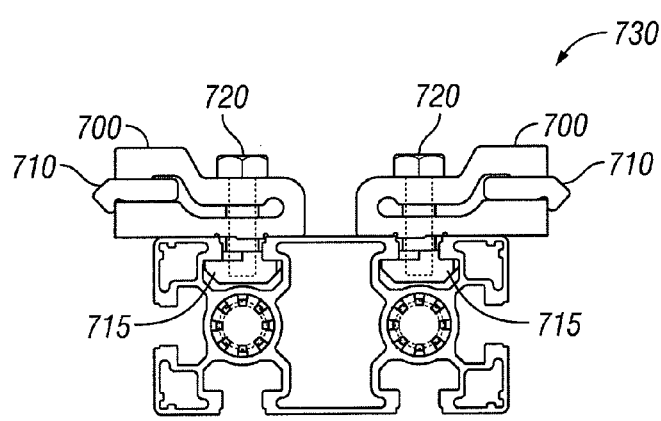
FIG. 7E

SYSTEM FOR HOLDING A LINEAR MOTION GUIDE TRACK TO A SUPPORT BASE AND METHOD THEREFOR

CROSS-REFERENCE TO RELATED APPLICATIONS

This is a continuation-in-part application of application Ser. No. 12/643,785, filed Dec. 21, 2009 now U.S. Pat. No. 8,434,946, which is a continuation-in-part application of application Ser. No. 12/260,754, filed Oct. 29, 2008 now U.S. Pat. No. 8,491,193, each of which are incorporated herein by reference.

BACKGROUND OF THE INVENTION

1. Technical Field

The invention relates generally to assembling a linear track in a guided motion system. In particular, the invention relates to a track assembly that provides a quick and easy method of assembly of linear motion guide tracks to standard base extrusions.

2. Description of the Prior Art

In manufacturing processes and within manufactured capital goods themselves, precise and repeatable motion is useful and often essential. For example, in manufacturing processes ranging from machining to textiles to electronics, tool heads or other items move back and forth and must do so precisely and repeatedly over enormous numbers of cycles. In other settings, specimens and instrumentation move relative to each other within laboratory analytic devices to collect data on the samples and must do so precisely and repeatedly.

Linear motion guides are used extensively in manufacturing processes and other applications to produce precise reciprocating motion cycles. Linear motion guides are typically supported on extruded support bases. For example, FIG. 1 shows a widely available aluminum extrusion support base 130 manufactured by the Parker Hannifin Corporation, located in Cleveland, Ohio. Similarly, guide tracks and guide wheels are widely available standard articles of manufacture. For example, DualVee® guide wheels and Single Edge guide tracks, both manufactured by Bishop-Wisecarver Corporation, are time-tested and ideal for a wide variety of applications.

Guide wheels attached to support bases and riding on rails are one class of guided motion technology that provides precise and repeatable kinematics. For example, U.S. Pat. No. 3,661,431 discloses guide wheels and tracks in which guide wheels cooperate with rails such that the guide wheels may move along the rails.

An exemplary guided motion assembly is shown in FIG. 1 and comprises a V-shaped guide track 120 and a DualVee® guide wheel 110 both manufactured by Bishop-Wisecarver Corporation, located in Pittsburg, Calif. The track 120 is coupled with a support base 130 using track clamp 125. In the illustrated embodiment of the invention, the support base 130 comprises an extrusion.

Known support bases are typically available in a standard sizes and configurations. For example, the support base 130 shown in FIG. 1 may be an extruded aluminum support base, such as that manufactured by Parker Hannifin Corporation.

Also widely used in the guided motion industry are track clamps for coupling the track with the support base. FIG. 1 illustrates a known track clamp 125 for coupling the V-shaped guide track 120 to a standard extrusion 130. Previous attempts of providing track clamps for standard support bases have been complicated, time consuming, difficult to assemble due to the need for fasteners, expensive to assemble, and unreliable due to the use of moving parts, among other shortcomings. Indeed, there are many disadvantages to the current state of the art.

Due to the deficiencies of the prior art, there is a need to provide a reliable, effective and easy-to-assemble guide track system for coupling guide tracks with linear motion support bases.

There is also a need for a method of manufacturing guide tracks that effectively couple with a standard support base without the use of fasteners. Additionally, there is a need to provide methods of assembling guided motion systems without using traditional fasteners.

Likewise, in applications in which the use of fasteners is preferable, there is a need for uncomplicated, easy-to-assemble, reconfigurable, and universally faster systems.

One drawback of the prior art is that linear guide tracks that use fasteners and track clamps are commonly designed for use with a specific base extrusion. For example, many known linear guide tracks are specifically designed to work with the various T-slot extrusions manufactured by Parker Hannifin Corporation. However, such specifically designed track assemblies cannot be used with other extrusion bases or configurations. Therefore, there is a need in the art for a guide track assembly that can be used with any extrusion having a T-slot configuration.

Another drawback to the prior art is that known solutions oftentimes require that the end user cut, drill, or otherwise machine a set of work pieces to initially configure a linear guide system. This is problematic for end users who do not possess a sophisticated machine shop or for those who do not possess the requisite skill to fabricate the required materials.

Furthermore, pre-drilled track is very expensive and requires a user to layout the substrate to which the track is to be assembled in advance. This too is problematic because the user must be especially precise and must have detailed plans well in advance. Moreover, once one particular setup is configured, it cannot be reconfigured without taking apart the entire system and re-drilling.

Another drawback to current linear motion systems is the width profile of a track assembly. For example, known linear motion guides are bulky.

Another significant drawback of the known art is that drilling track and attaching it to a substrate with a plurality of individual fasteners oftentimes results in undulations and imperfections in the linear track. These undulations can negatively affect the entire system.

Likewise, it is difficult to maintain parallelism of the tracks when fastening a guide track to a support base. Oftentimes, parallelism in the tracks is of the utmost importance. For example, a track that deviates even slightly from parallel can negatively affect the performance of an entire linear motion system.

Some other prior art solutions include simply placing a track directly into a T-slot of a base support extrusion. These known solutions oftentimes result in an unacceptably imprecise fit. For example, commercially available base support extrusions will vary in T-slot width for any given mill run. Therefore, a track having a uniform width will either fit too tightly or too loosely within the extrusion's T-slot. Therefore, there is a need to provide a track support extrusion that can reliably accommodate a standard-sized track despite the occasion of small size variances.

SUMMARY OF THE INVENTION

The invention provides novel approaches to manufacturing and assembling linear motion guide tracks that are quick and easy to install. Some embodiments of the invention involve a track clamp that couples with standard linear motion support bases without the use of fasteners.

The elimination of fasteners results in lower cost, faster assembly, and increased structural integrity due to the elimination of drill holes and tapped holes in the track. According to some embodiments of the present invention, traditional fasteners are replaced with track clamp having deformable teeth protrusions.

Some embodiments of the invention utilize track clamps having a pressure insert portion with teeth protrusions that deform upon coupling with the support base. The deformation of the track clamp teeth ensures a tight fit without the use of fasteners.

Various embodiments of the invention include track clamps designed to couple tracks to support bases in a variety of configurations including tracks disposed orthogonally to the support base. In some embodiments of the present invention, track clamps are designed with shoulder extensions to provide extra support to withstand lateral forces bearing on the track.

In some embodiments of the invention, the track clamp is designed to suit any slot in a wide variety of extrusions or barstock material. According to one aspect of the present invention, the track clamp enables the user to integrate a V-shaped edge track into the T-slots of standard structural extrusion support bases.

Some embodiments of the invention teach low cost methods of installing linear motion tracks into structural extrusion support bases. In some embodiments, the novel track clamp is simply installed using a soft-headed mallet. In some other embodiments, the track is able to be installed by using a cross-head arrangement of rollers to uniformly apply force to insert the track clamp and track into standard structural extrusion support bases.

In some embodiments, the track clamp and guide track are assembled in a factory. In some other embodiments, the track clamp and guide track are assembled on-site by an end user.

In some embodiments of the invention, the track clamps are integrated with widely available standard aluminum extrusion support bases. In some embodiments of the present invention, track clamps are especially designed to accommodate various sized V-shaped edge tracks For example, in some embodiments, the track clamp is designed for tracks sized 0 thru 4, in carbon steel or stainless steel. In some embodiments of the invention, the track and track assembly are chosen to be used with DualVee® guide wheels, manufactured by Bishop-Wisecarver Corporation.

In some embodiments of the present invention, methods of manufacturing track clamps having deformable teeth protrusions are disclosed.

Some embodiments of the invention include a bolt-on track clamp for housing a track and coupling with a support base extrusion. These solutions provide customers with a simple-to-assemble, customizable, reconfigurable, and user-friendly solution for reliable track assembly.

Some other embodiments include a back-to-back track configuration that is coupled to a proprietary base extrusion using clamping washers. These solutions are also user-friendly and convenient, and they also save space.

In yet other embodiments, a custom made extrusion includes deformable fingers in a T-slot for handling varying track widths and for resisting unplanned disengagement of the track from the support base.

Some embodiments of the invention involve track clamp for coupling a track with a base extrusion via a support extrusion and a wedge assembly. Some other embodiments of the invention involve a double-edged support extrusion for coupling a track with a guide wheel via a wedge assembly according to some embodiments of the invention.

BRIEF DESCRIPTION OF THE DRAWINGS

FIG. 7C is an exploded upper isometric view of a support base extrusion and two bolt-on track clamps of the type shown in FIGS. 7A and 7B according to the invention;

FIG. 7D is an end view of a nut used in a bolt-down track clamp according to the invention;

FIG. 7E is an end view of an assembled track system with bolt-on track clamps coupled with support base extrusions according to the invention;

FIG. 8A is an exploded upper isometric view of a back-to-back track assembly according to the invention;

DETAILED DESCRIPTION OF THE INVENTION

Figure 1:
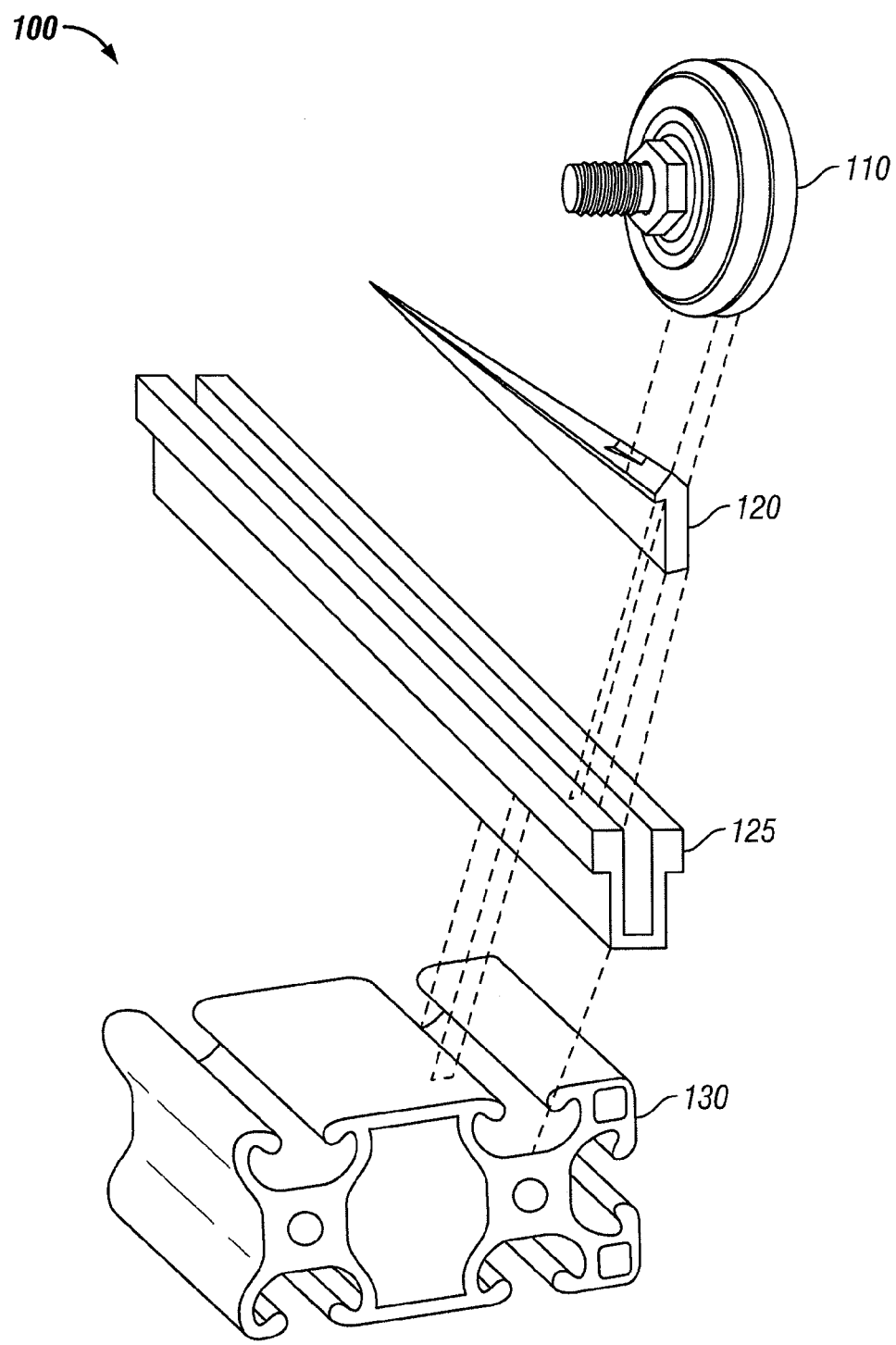
FIG. 1 is an exploded upper perspective view of a guided motion assembly requiring fasteners previously known in the art.
Figure 2A:
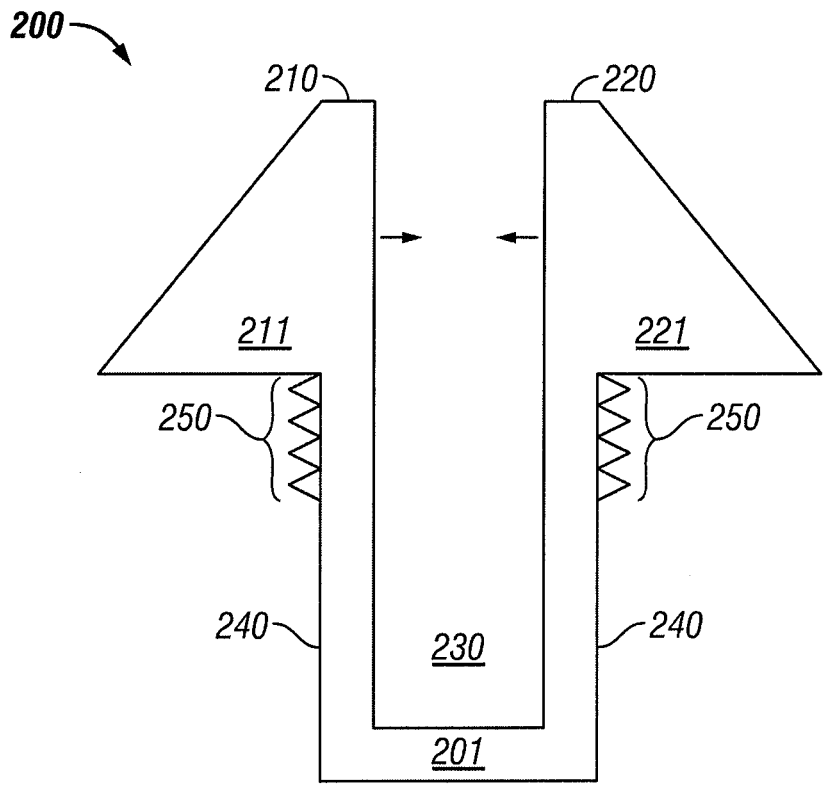
FIG. 2A is an end view of a track clamp according to the invention.
Figure 2B:
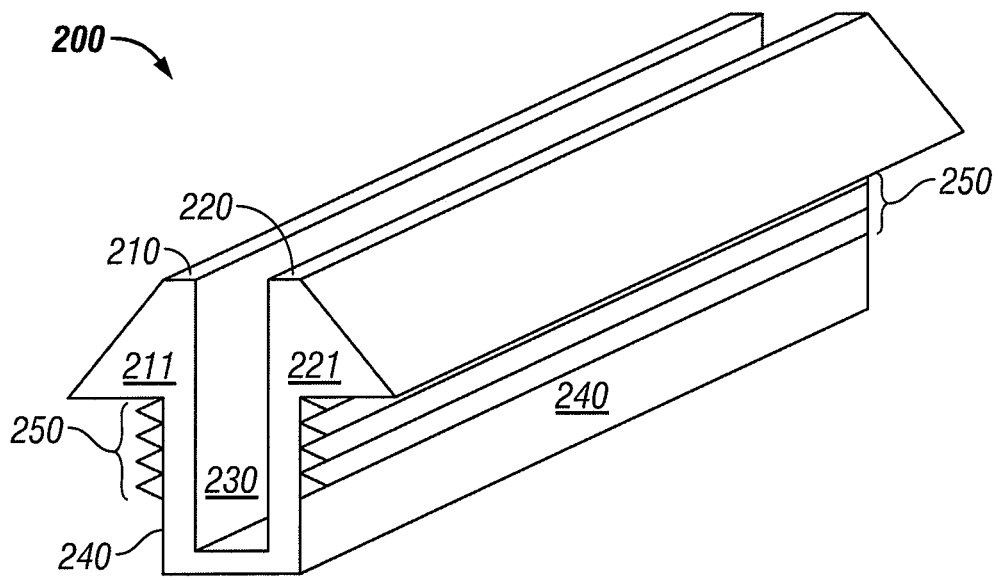
FIG. 2B is an isometric view of the track clamp shown in FIG. 2A.
Figure 2C:
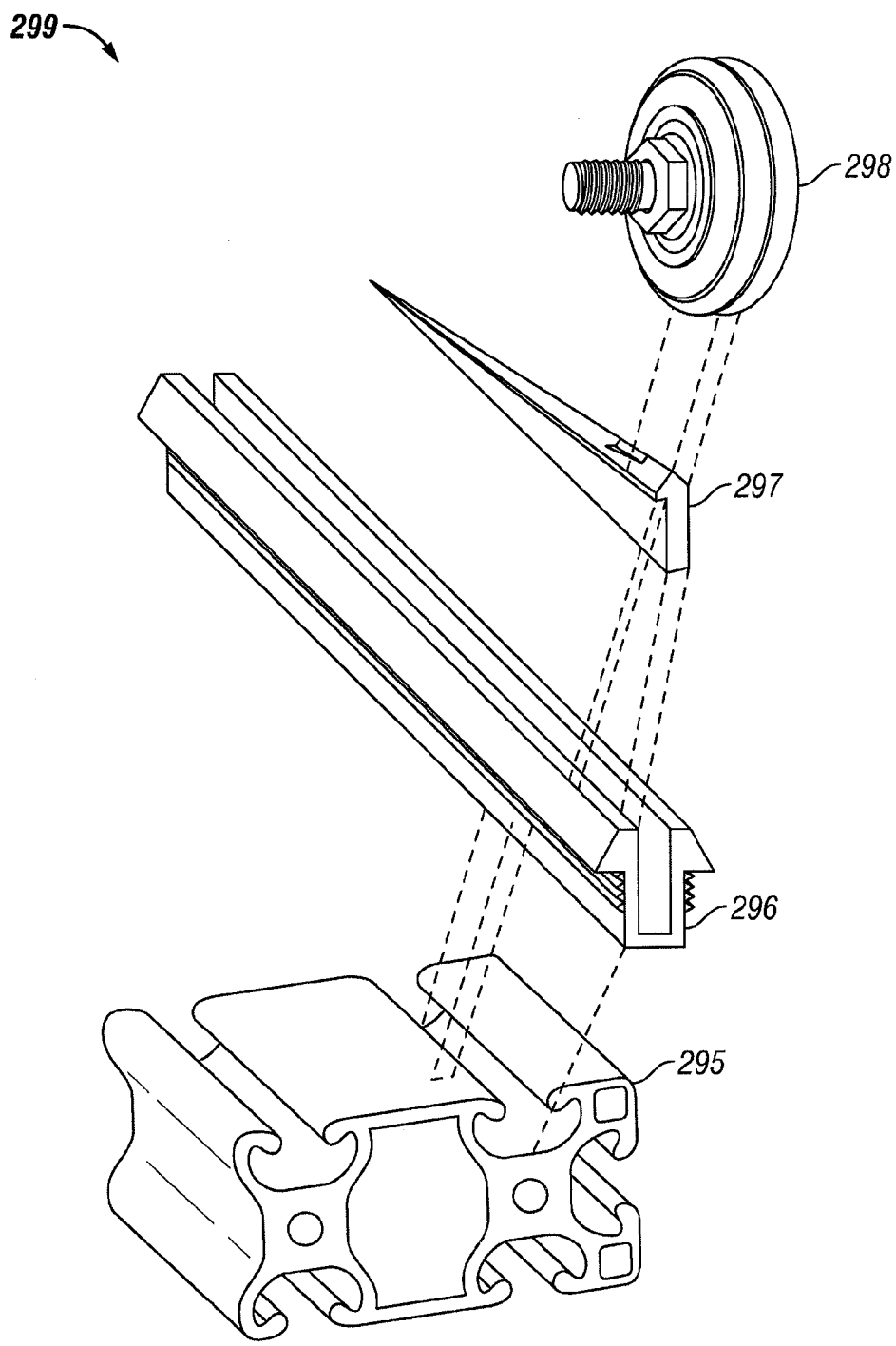
FIG. 2C is an exploded upper perspective view of a guided motion assembly according to the invention.

A track clamp for coupling a linear motion guide track to a support base according to the invention is referred to at 200 in FIGS. 2A-2C. The track clamp 200 comprises two clamp arms 210, 220 which are connected to a base section 201 to form a well 230. As shown, the two arms 210, 220 extend vertically away from the base section 201 and terminate at a fixed distance from the base section 201, thus defining well 230.

The well 230 is configured to accommodate a linear motion guide track 297. Two shoulders 211, 221 are disposed at the end, and on the outer sides of the arms 210, 220. As described, the assembly 200 is configured to be inserted into a support base 295 such that the well is disposed within the support base. Likewise, the support base interacts with the shoulders 211, 221 such that the assembly rests upon the surface of the support base. Additionally, two sets of teeth protrusions 250 are disposed on the outer surfaces 240 of the arms 210, 220. In the illustrated embodiment of the present invention, the teeth protrusions 250 are configured such that they must be deformed to be inserted into a support base, thus coupling with the support base without using fasteners.

The teeth protrusions 250 are deformed and/or sheared by the press-fitting into a support base extrusion 295. Preferably, the deformation of the teeth protrusions 250 causes the arms 210, 220 to be displaced toward each other as indicated by the arrows in FIG. 2A. The displacement clamps a track 297 between the arms 210, 220.

According to one aspect of the invention, the deformation of the teeth protrusions 250 effectuates a cold-pressure solid-state welding process.

A suitable guide wheel 298 is a DualVee® guide wheel manufactured by Bishop-Wisecarver Corporation. A suitable guide track 297 is a V-shaped guide track also manufactured by Bishop-Wisecarver Corporation, designed for use with DualVee® guide wheels.

Figure 3A:
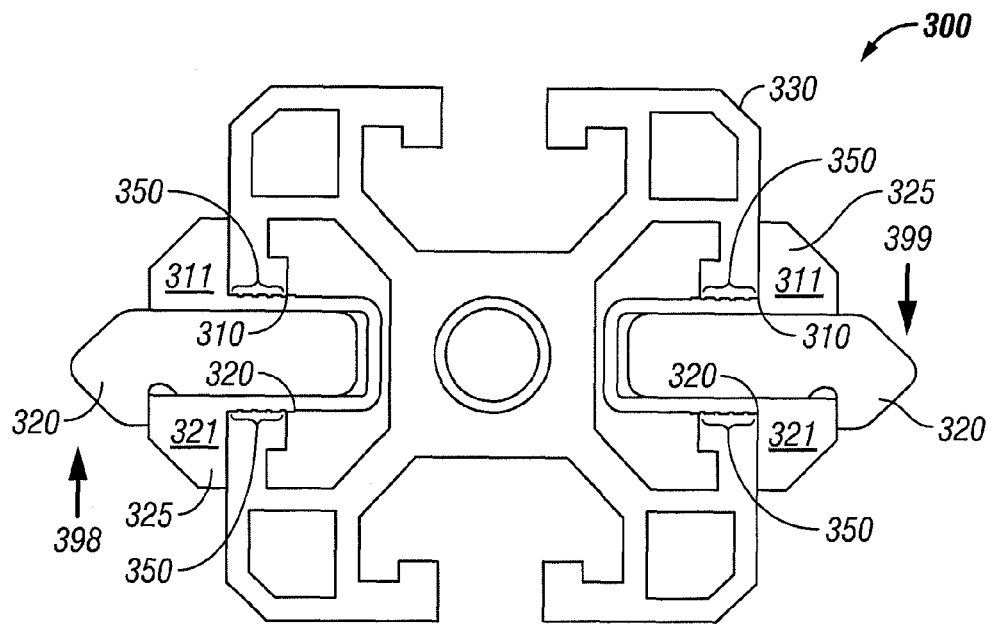
FIG. 3A is an end view of a support base extrusion coupled with a pair of linear motion tracks via track clamps according to the invention.

With reference now to FIG. 3A, a track assembly 300 is shown wherein track clamps 325 are press-fitted into a support base 330. In one aspect of the invention, each track clamp 325 is configured such that it is easily coupled with the support base 330 using only hand tools. In the illustrated embodiment of the present invention, the track clamp 325 is configured such that a simple rubber mallet can easily force the track clamp into the support base 330. However, it will be readily apparent to those having ordinary skill in the art that a wide variety of coupling mechanisms can be used.

The simple and secure coupling ability of the invention provides distinct and useful advantages of the approaches known in the art. For example, since linear motion tracks can be easily assembled without expensive and complicated tools, a cost savings is realized. Additionally, the time to install a linear motion track is reduced through the elimination of complicated assembly techniques. By using a track clamp 325 that is compatible with standard extrusions, investment in all new support bases is unnecessary and greater manufacturing consistency is possible. Furthermore, the track clamps 325 of the invention provide a more secure coupling than other coupling techniques that do not use traditional fasteners.

As explained above, teeth protrusions 350 are disposed on the arms 310, 320 of the track assemblies 320. As a result of the press-fitted coupling, the teeth protrusions 350 are deformed, thus ensuring a secure fit between the track clamp 325 and the support base 330. Additionally, the shoulders 311, 321 provide additional support to the track 320. For example, torque applied to the track 320 (indicated with arrows 398, 399) is resisted by the shoulders 311, 321.

It will be readily apparent to those having ordinary skill in the art that the components disclosed in FIG. 3A, and in other embodiments of the invention may take various sizes, shapes and appearance. In some embodiments, the arms 310, 320 of the track clamp 325 are spaced between 3 mm and 12 mm apart. In some embodiments, the track 320, the base 330 and the track clamp 325 are between 3 m and 6 m long.

In some embodiments, the track clamp 325, as recited, is substantially comprised of steel. In some embodiments, the track clamp 325 as recited is substantially comprised of stainless steel. In some embodiments the track clamp 325 is formed by extrusion. In some embodiments the track clamp 325 is formed by metal injection molding.

Figure 3B:
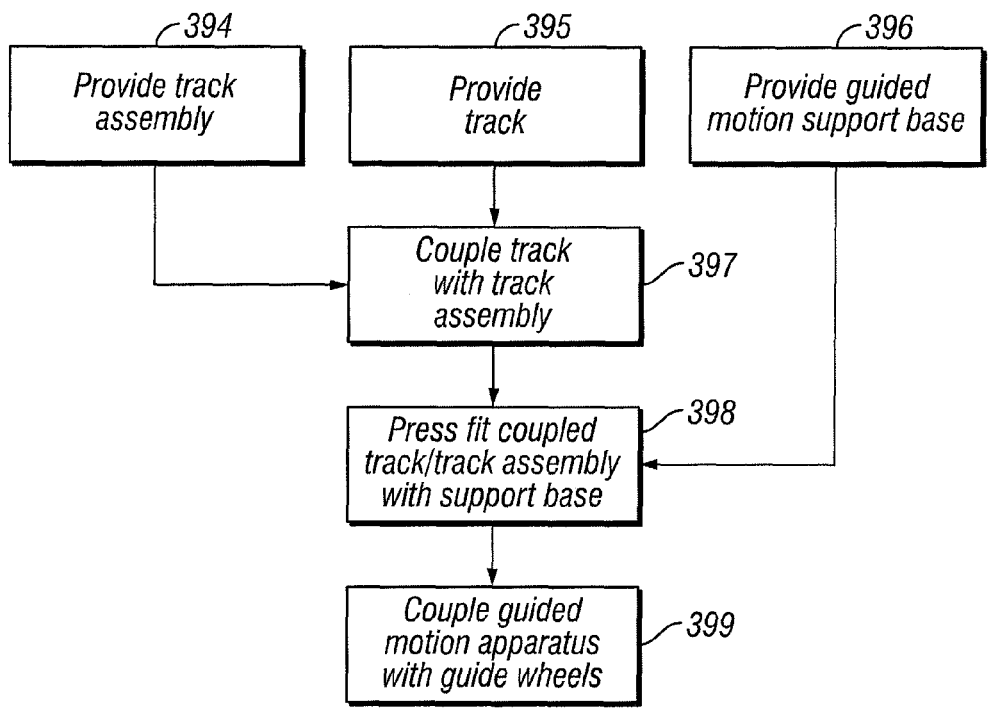
FIG. 3B is a flow chart illustrating process steps for a method of manufacturing a guided motion system according to the invention.

Method steps of manufacturing a guided motion system using the novel track clamp of the invention are shown in FIG. 3B. The method starts by providing a guided motion support base 396, providing a track 395, and providing a track clamp 394 as discussed above. The guided motion support base has at least one conduit disposed therein for accepting the track clamp. In some embodiments of the invention, the track clamp has a cross-section that is substantially U-shaped and includes a plurality of teeth protrusions disposed on the outside surface of the assembly.

The method of manufacturing shown in FIG. 3B continues with coupling the track with the track clamp 397. Next, the coupled guide track/track clamp is press-fitted into the conduit of the support base 398. As explained above, a rubber mallet may easily tap the track/track clamp into the support base. According to some embodiments, the teeth protrusions on the track clamp are deformed when the track clamp is press-fitted in the support base, thus providing a secure coupling. Finally, the assembled guided motion assembly is slidably coupled with one or more guide wheels 399.

In some embodiments of the invention, the method further comprises manufacturing the track, the support base, and/or the track clamp. In other embodiments, the components are formed using an extrusion. In still other embodiments, the components are formed by metal injection molding.

Although FIG. 3A illustrates a support base 330 with two track assemblies 325 and two guide tracks 320, it will be readily apparent to those having ordinary skill in the art, that guide track assemblies in a variety of configurations may be formed according to the invention.

Figure 4:
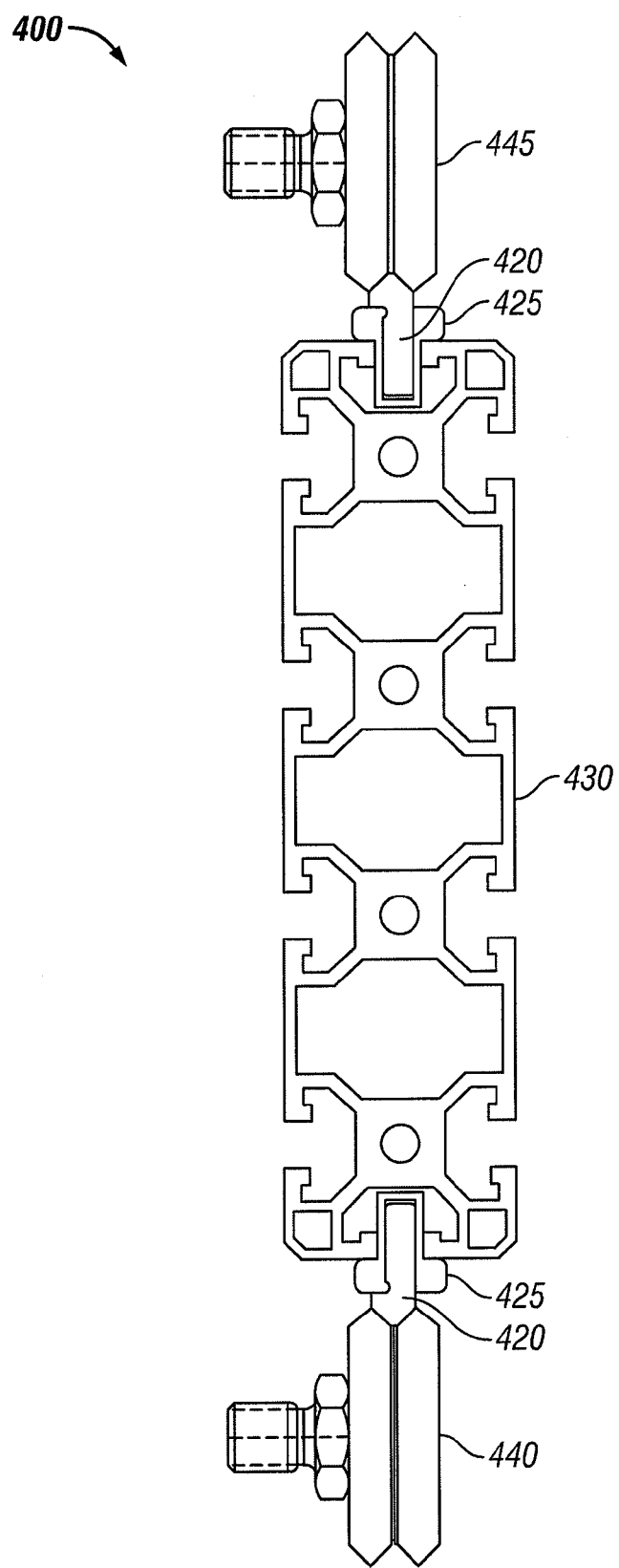
FIG. 4 is an end view of an alternative support base extrusion coupled with a pair of linear motion tracks via track clamps according to the invention.
Figure 5:
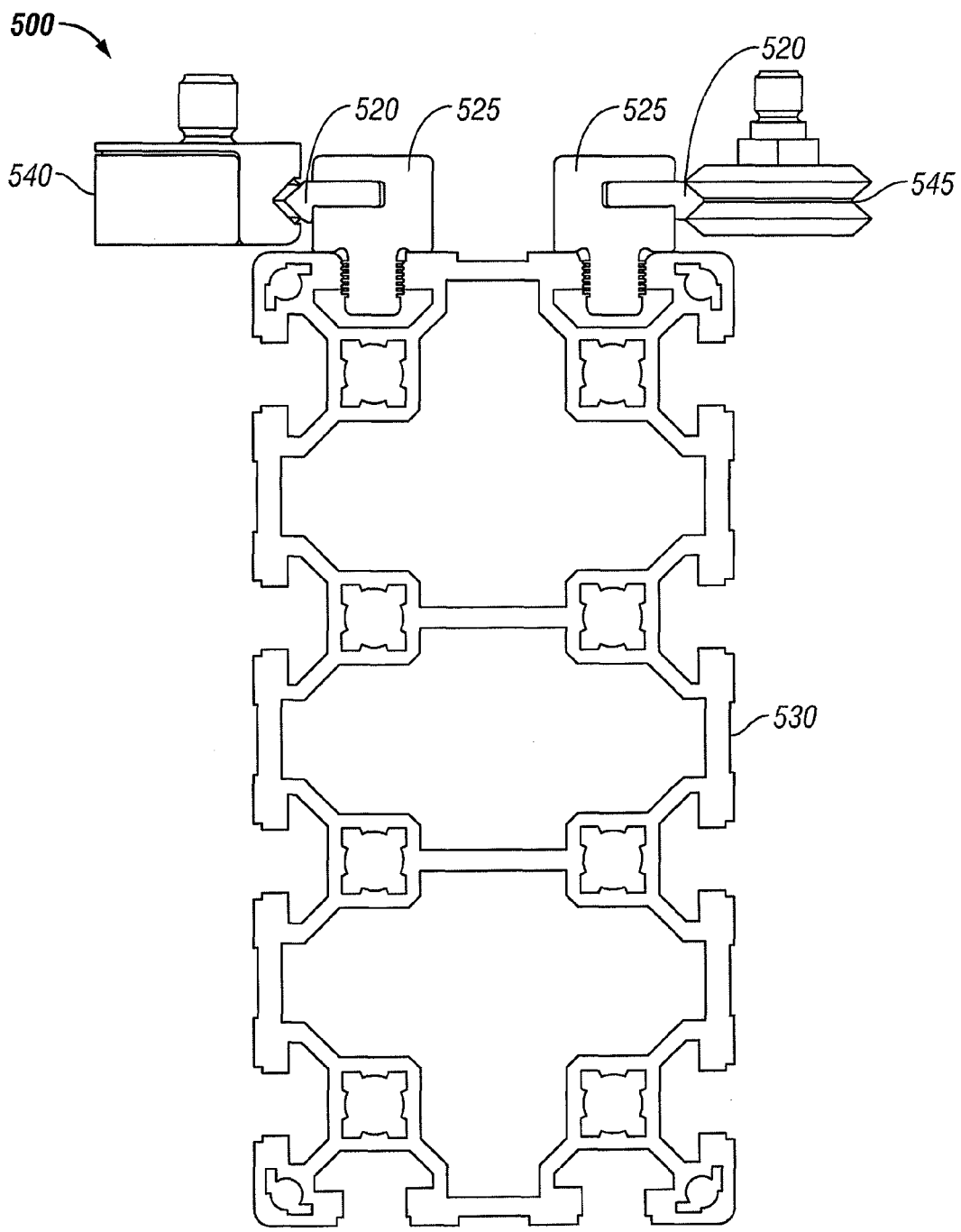
FIG. 5 is an end view of third support base extrusion coupled with a pair of linear motion tracks via track clamps according to the invention.
Figure 6:
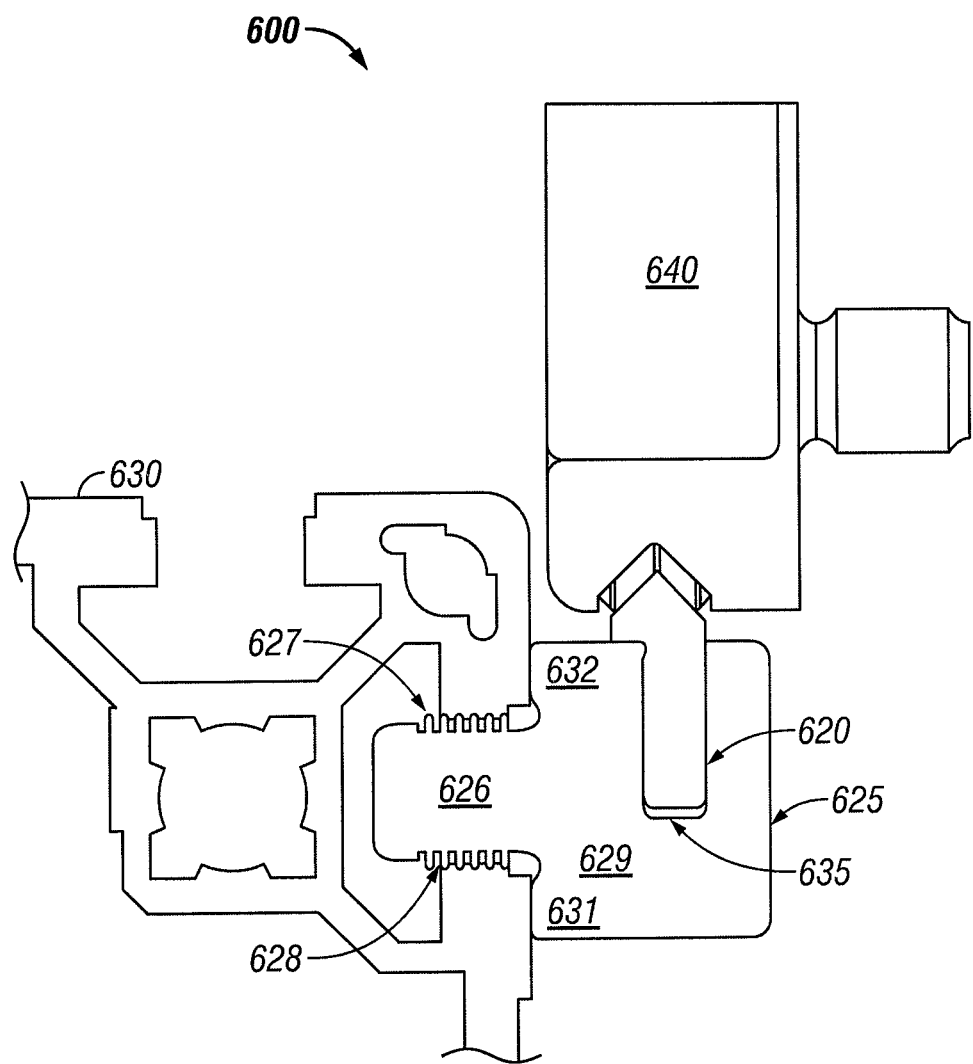
FIG. 6 is an end view of an fourth support base extrusion coupled with a linear motion track via a track clamp according to the invention.

FIGS. 4-6 illustrate several alternate embodiments of linear motion tracks using track assemblies according to the invention.

FIG. 4 shows a linear motion apparatus 400 comprising a support base 430 disposed vertically between two guide wheels 440, 445. The support base 430 is coupled to tracks 420 via assembly 425. One or more teeth protrusions such as those discussed above, although not shown, are disposed on the assembly 425.

FIG. 5 shows another linear motion apparatus 500 comprising a support base 530 disposed between two guide wheels 540, 545. The support base 530 is coupled to tracks 520 via assembly 525. One or more teeth protrusions such as those discussed above, although not shown, are disposed on the assembly 525.

Referring next to FIG. 6, a linear motion apparatus 600 comprising a support base 630 is disposed vertically between two guide wheels 640, 645. The support base 630 is coupled to tracks 620 via track clamp 625. A plurality of teeth protrusions 627, 628 are disposed on the assembly 625.

The track clamp 625 includes a plug section 626 having a plurality of teeth protrusions 627, 628 disposed on the outer side of the plug section 626. Additionally, the plug section 626 includes a cap section 629 coupled to the plug section 626 wherein the cap section 629 is at least partially wider than the plug section, forming shoulders 631, 632 which rest upon the surface of the support base 630 when the track clamp 625 is coupled with the base section 630. Furthermore, a well 635 is disposed in the cap section 629 configured to hold the track 620 therein. According to some embodiments of the present invention, and as shown in FIG. 6, the orientation of the well 635 within the cap section 629 is substantially orthogonal to the orientation of the plug section 626. In some embodiments of the invention, the cap section 629 and the plug section 626 form an integral whole.

As explained above, there is an existing need in the art for an apparatus and system for providing customers with a simple-to-assemble, customizable, reconfigurable, and user-friendly solution for reliable track assembly. To meet this need, some other embodiments of the invention involve fastening of a track to a support base using standard commercially-available hardware and a novel bolt-on clamp extrusion. The bolt-on clamp extrusion also allows effortless parallel alignment of the track using a raised alignment ridge that accommodates variously-sized bolt-receiving slots in support base extrusions. Other advantages of these embodiments of the invention will be readily apparent to those with ordinary skill in the art.

Figures 7A, 7B:
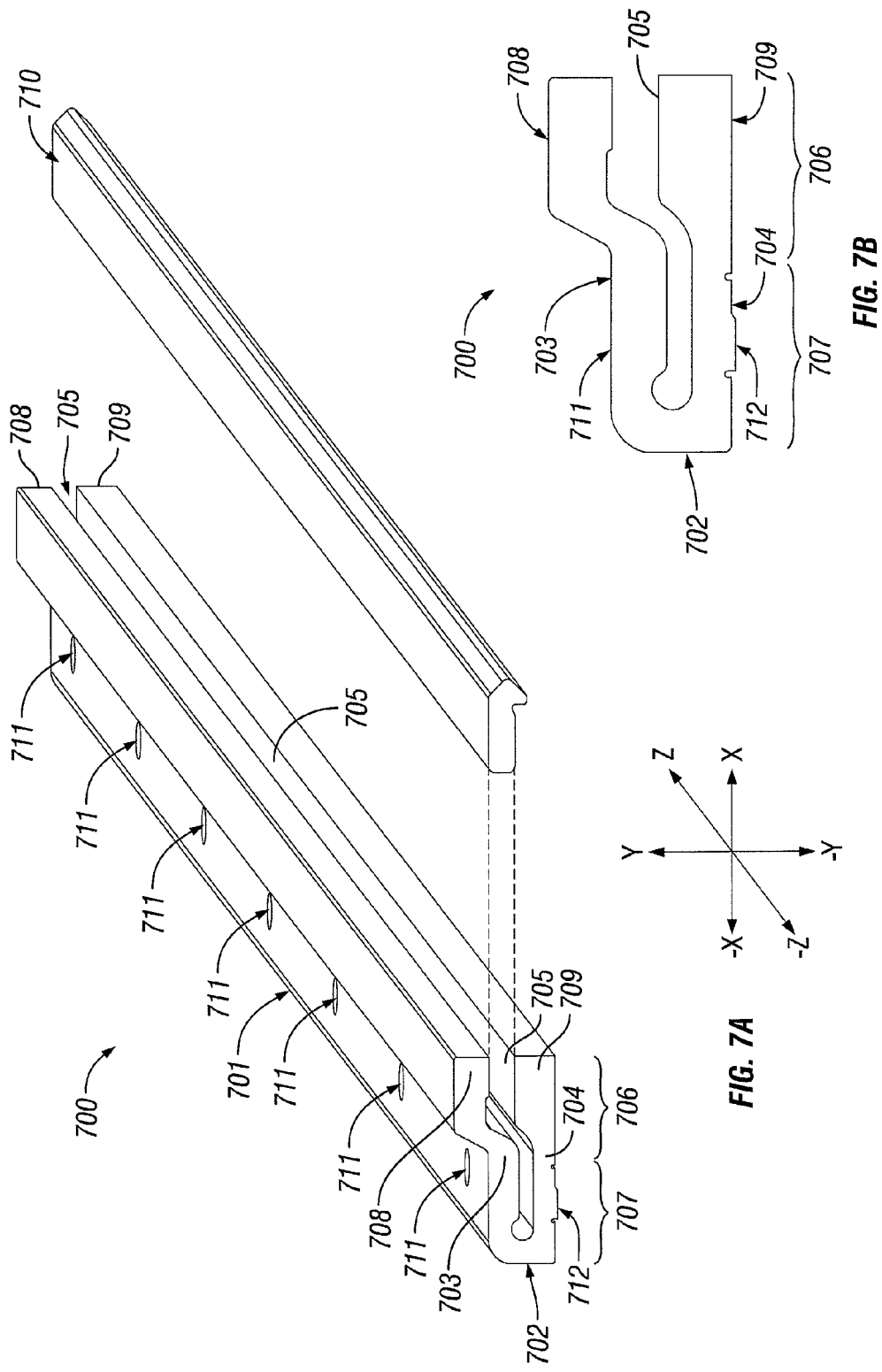
FIG. 7A is an upper isometric view of a bolt-on track clamp and a track according to the invention.
FIG. 7B is an end view of the bolt-on track clamp shown in FIG. 7A.
Figure 7F:
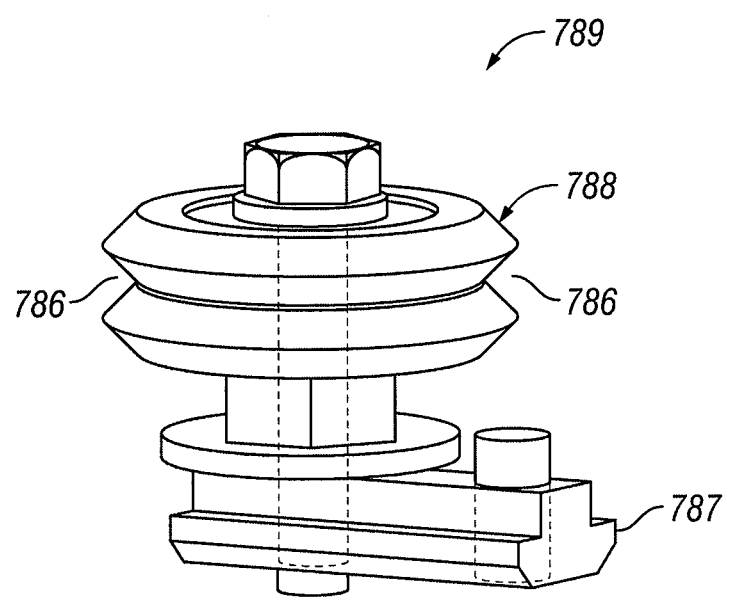
FIG. 7F is an upper isometric view of a guide wheel assembly according to the invention.

A bolt-on clamp extrusion 700 and a track 710 according to the invention are shown in FIGS. 7A and 7B. The bolt-on clamp extrusion 700 comprises an elongated, integral axial member 701 having a connected end 702 and two arms 703, 704 disposed in parallel planes. The two arms 703, 704 terminate with two clamping fingers 708, 709 in a finger-clamping region 706 at the end opposite the connected end 702.

The two horizontally disposed arms 703, 704 define a gap 705 extending along the length of the bolt-on clamp extrusion 700. The gap 705 is configured to accept the insertion of a track 710. The gap 705 extends in the X-direction past the finger-clamping region 706 into a bolt-down region 707.

The bolt-down region 707 of the arms 703, 704 includes a plurality of pre-drilled conduits 711, each of which line up in the Y-direction as they pass through each of the arms 703, 704. The pre-drilled conduits 711 are configured for accommodating a bolt 720 such that at least a portion of the bolt extends completely through each conduit 711 for coupling with a nut 715. The bolt-down region 707 also includes an outwardly-protruding alignment ridge 712 extending axially on the underside length of the bolt-on clamp extrusion 700. The alignment ridge 712 is configured to self-align with a slot of a support base extrusion 798 such that a track 710 inserted in to the bolt-on clamp extrusion 700 remains parallel to the support base extrusion.

Maintaining parallelism between the track and the support base extrusion is extremely important. However, as explained above, previous solutions require careful measuring, alignment, and drilling. Accordingly, self-alignment between the alignment ridge 712 and a slot of the support base extrusion provides a simple way to position the two work pieces in parallel alignment when assembling a track system.

In some embodiments of the invention, the alignment ridge 712 is narrower than the width of the slot of the support base extrusion, such that the alignment ridge 712 can align with either side of the slot.

This embodiment of the invention combines the multiple advantages of sure formation of parallel guide tracks, a secure coupling and clamping mechanism, and ease of assembly. For example, a user of the bolt-on clamp extrusions 700 does not need a sophisticated machining shop to assemble a linear guide system. As explained above, known solutions oftentimes require that the end user cut, drill, or otherwise machine work pieces to configure a linear guide system. However, bolt-on clamp extrusions require only commercially available parts and are easily assembled and reconfigured.

A support base extrusion 799 and two bolt-on clamp extrusions 700, according to another embodiment, of the invention is shown in FIGS. 7C and 7E. The support base extrusion 799 comprises an integral member 798 extending axially in the z-direction. The support base extrusion 799 comprises a plurality of T-slots 797 disposed along the length of the support base extrusion 799.

The pre-drilled conduits 711 of the bolt-on clamp extrusions 700 align with T-slots 797 of the support base extrusion 799 and a plurality of nuts 715 and bolts 720 couple the bolt-on clamp extrusions 700 with the support base extrusion 799. The plurality of nuts 715 are inserted into the T-slots 797 of the support base extrusion 799.

A nut 715, shown in FIG. 7D, includes arms 716 which contact the inner-surface of the T-slot 797 when the nut 715 is tightened.

In the illustrated embodiment, a plurality of bolts 720 is inserted through the pre-drilled conduits 711 and extends into the T-slots 797 where they couple with nuts 715. In the illustrated embodiments of the invention, tightening the bolts 720 to the nuts secures the bolt-on clamp extrusions 700 to the support base extrusion 799.

Tightening the nuts 715 and bolts 720 also deforms the arm 703 and the finger 708, thereby clamping the finger-clamping region 706 onto the track 710 inserted therein.

A guide wheel assembly 789 suitable for use with the track system 730 shown in FIGS. 7C and 7E comprises a DualVee® guide wheel 788 coupled with a T-bar 787. The T-bar 787 is configured to slidably couple with a T-slot of a standard beam extrusion. The DualVee® guide wheel 788 includes a V-shaped valley 786 for accommodating a track 710 of the track system 730.

Figure 7G:
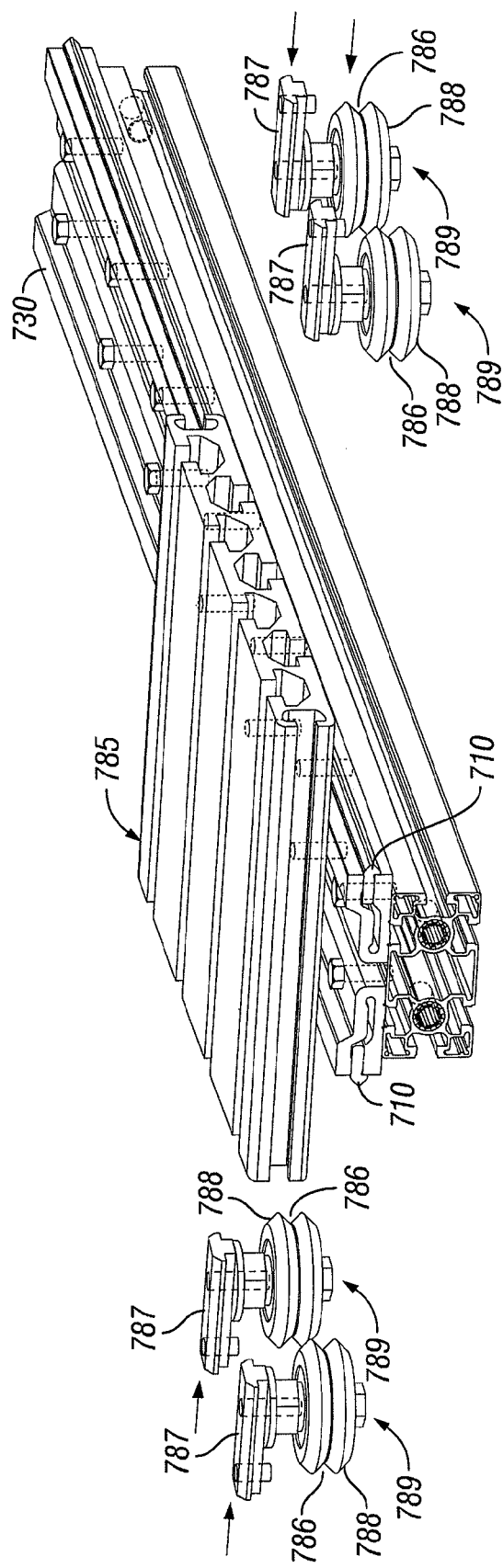
FIG. 7G is an exploded upper isometric view of an assembled track system capable of being coupled with a slidable beam extrusion via a plurality of guide wheel assemblies according to the invention.

FIG. 7G shows an assembled track system 730 ready for coupling with a slidable beam extrusion 785 using a plurality of guide wheel assemblies 789. The track bars 787 of the guide wheel assemblies 789 slide into a T-slot of the slidable beam extrusion 785 until the track 710 is engaged with the V-shaped valley 786 of the DualVee® guide wheel 788. In some embodiments of the invention, a felt wiper may be coupled to slidable beam extrusion 785. In yet other embodiments, a brake mechanism can be included in the system.

The bolt-on clamp extrusion track assemblies 730 provide users with a simple-to-assemble, customizable, reconfigurable, and user-friendly solution for reliable track assembly. Moreover, the tracks are readily replaceable to accommodate tracks made of other material and to service a track that may need to be straightened or otherwise serviced. Other advantages will be apparent to those with ordinary skill in the art having the benefit of this disclosure.

FIGS. 8A through 8D illustrate additional embodiments of the invention including a back-to-back track assembly 800.

Figure 8B:
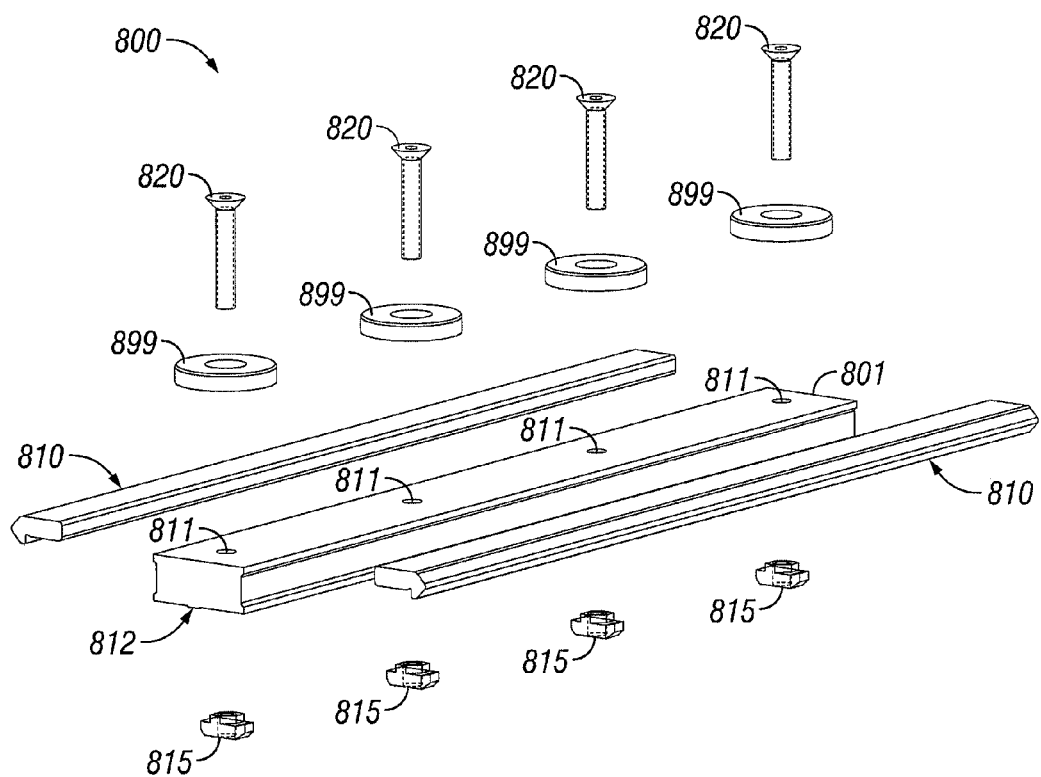
FIG. 8B is a partially transparent upper isometric view of a retaining washer used in the assembly shown in FIG. 8A.
Figure 8B:
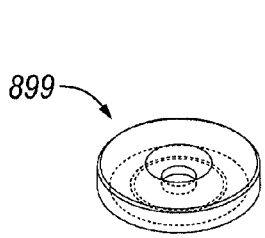
Figure 8C:
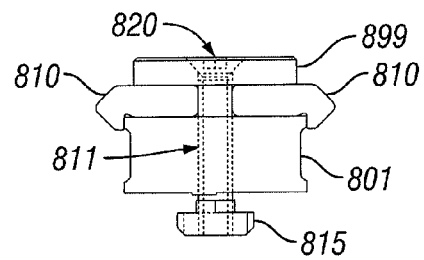
FIG. 8C is an end view of the back-to-back track assembly shown in FIG. 8A in an assembled configuration.

The back-to-back track assembly 800 shown in FIG. 8A includes a base extrusion 801 that includes an outwardly-protruding alignment ridge 812 configured to self-align with a slot of a support base extrusion (not shown), as explained above. The base extrusion 801 also includes a plurality of pre-drilled conduits 811, each of which line up in the Y-direction as they pass through the base extrusion 801. The pre-drilled conduits 811 are configured for accommodating a plurality of bolts 820 such that at least a portion of the bolts 820 extend completely through the base extrusion 801 for coupling with one of a plurality of nuts 815. The back-to-back track assembly 800 also includes two tracks 810 that lay on the base extrusion 801 and are coupled to the base extrusion 801 via a plurality of retaining washers 899. As shown in FIG. 8C, the retaining washers 899 couple the tracks 810 to the base extrusion 801 by sandwiching the tracks 810 between the retaining washer 899 and the base extrusion 801 and securing the coupling by screwing the bolt 820 into the nut 815. In the illustrated embodiment of the invention, the retaining washers 899 are countersunk, as shown in FIG. 8B.

Figure 8D:
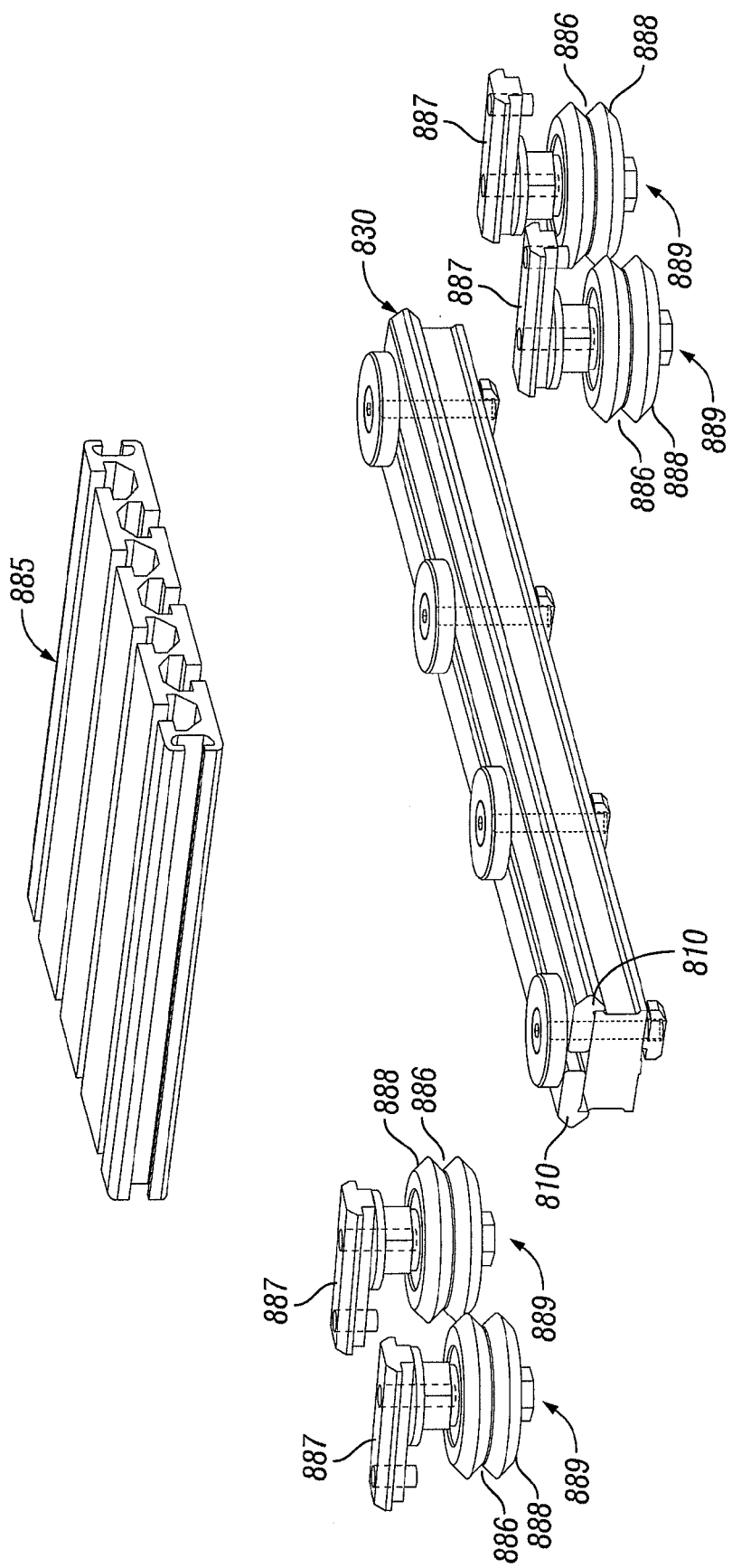
FIG. 8D is an exploded view of the track assembly shown in FIGS. 8A-8C, a support base, and a plurality of guide wheel assemblies according to the invention.

FIG. 8D is an exploded view of an assembled track system 830 ready for coupling with a slidable beam extrusion 885 using a plurality of guide wheel assemblies 889. The track bars 887 of the guide wheel assemblies 889 slide into a T-slot of the slidable beam extrusion 885 until the track 810 is engaged with the V-shaped valley 886 of the DualVee® guide wheel 888. In some embodiments of the invention, a felt lubrication wiper may be coupled to slidable beam extrusion 885. In yet other embodiments, a brake mechanism can be included in the system.

The back-to-back track assemblies also provide users with a simple-to-assemble, customizable, reconfigurable, and user-friendly solution for reliable track assembly. Moreover, the tracks are readily replaceable to accommodate tracks made of other material and to service a track that may need to be straightened or otherwise serviced. Other advantages will be apparent to those with ordinary skill in the art.

Figure 9A:
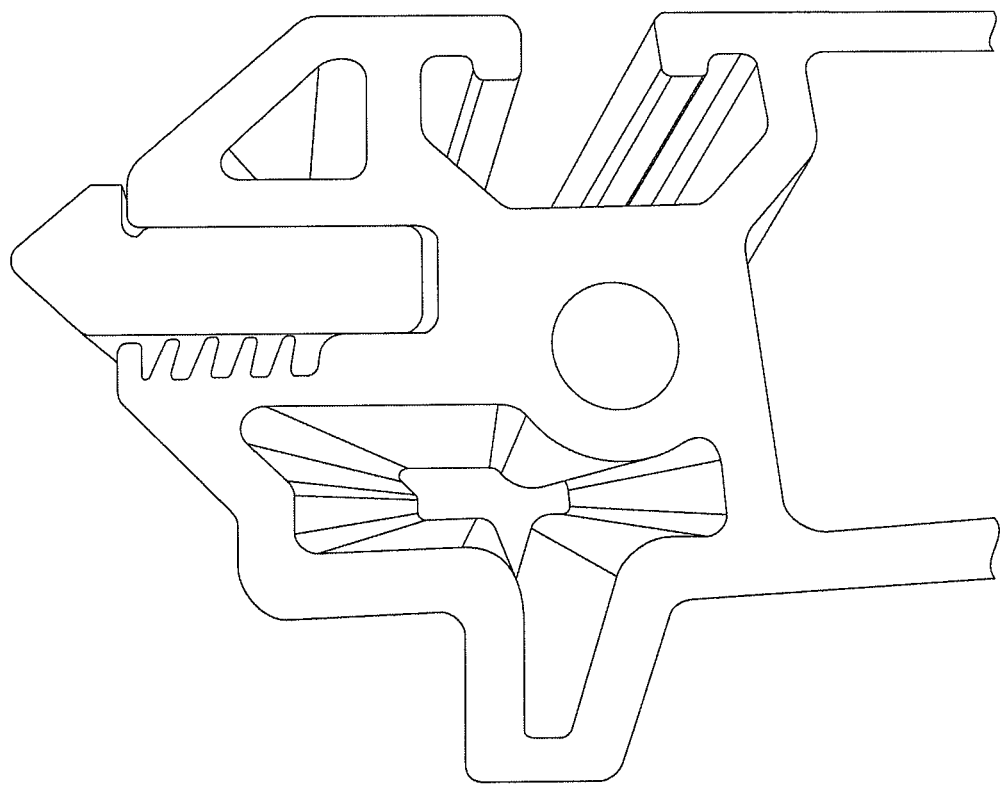
FIG. 9A is a disappearing end perspective view of a support base extrusion having a plurality of deformable fingers disposed in a track slot with a track inserted therein according to the invention.
Figure 9B:
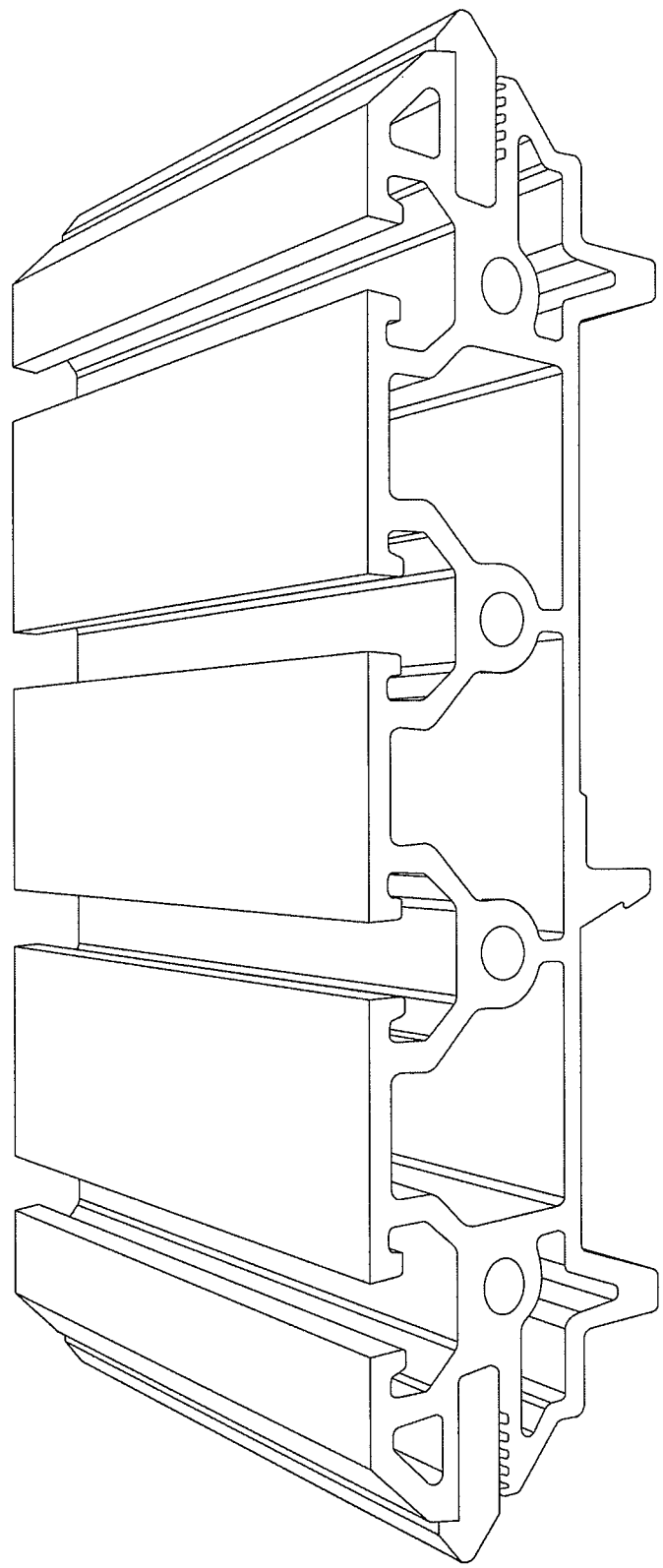
FIG. 9B is an upper perspective view of support base extrusion having a plurality of deformable fingers disposed in oppositely disposed track slots, each track slot having a track inserted therein, according to the invention.

Other embodiments of the invention include a custom-made, snap-in support base extrusion for holding a track without the use of an assembly or without using fasteners. FIGS. 9A and 9B illustrate some other embodiments of the invention which include a snap-in support base extrusion 999.

As explained above, some other prior art solutions include simply placing a track directly into a T-slot of a base support extrusion. These known solutions results in an unacceptably imprecise fit. For example, T-slots in commercially available base support extrusions will vary in width for any given mill run. Therefore, a track having a uniform width will either fit too tightly or too loosely within the slot. A solution to this problem is addressed by creating a plurality of deformable fingers in a track slot that elastically and/or plastically deform when a track is inserted into the slot, thereby resisting the removal of the track and ensuring a tight fit despite variations in track or slot size.

FIG. 9A shows a support base extrusion with a plurality of deformable fingers disposed in the slot with a track inserted therein according to some embodiments of the invention. FIG. 9B shows an alternate example of a support base extrusion with a plurality of deformable fingers disposed in the slot with a track inserted therein according to some other embodiments of the invention.

Figure 10A:
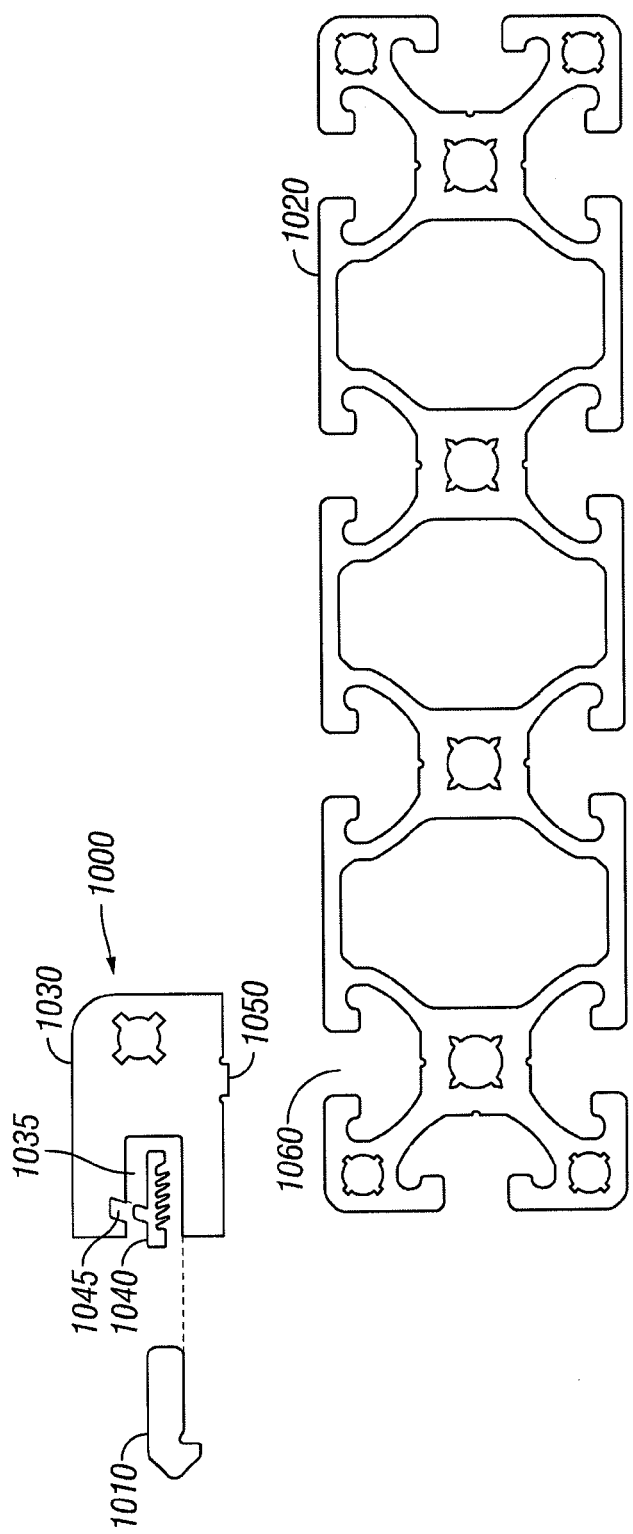
FIG. 10A an exploded end view of an assembly for coupling a track with a base extrusion via a support extrusion and a wedge assembly according to the invention.
Figure 10B:
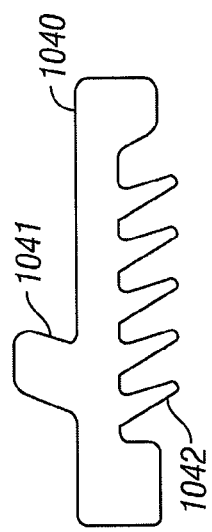
FIG. 10B is an end view of a wedge assembly according to the invention.

Another solution to imprecisely-fitting tracks involves the introduction of a wedge assembly into a slot on a support extrusion along with the track. FIG. 10A shows an assembly 1000 for coupling a track 1010 with a base extrusion 1020 via a support extrusion 1030 and a wedge assembly 1040 according to one embodiment of the invention. As seen in FIG. 10B, the wedge 1040 comprises a protrusion 1041 on a first side of the wedge 1040 and a plurality of deformable teeth 1042 on an opposite side of the wedge 1040.

In the illustrated embodiments of the invention, the protrusion 1041 and the plurality of deformable teeth 1042 extend along the length of the wedge assembly 1040. However, in other embodiments, the protrusion 1041 and the plurality of deformable teeth 1042 are placed regularly, intermittently, randomly, or bookended along wedge 1040.

Referring again to FIG. 10A, the support extrusion 1030 includes a well 1035 and a slit 1045 extending along the length of the support extrusion 1030. The slit 1045 is configured for securely accepting the protrusion 1041 of the wedge 1040 when the wedge 1040 is inserted into the well 1035. Likewise, the track 1010 is configured to be press-fitted into the well 1035 by deforming or shearing the teeth 1042 of the wedge 1040, thereby securely holding the track 1010 within the support extrusion 1030. Indeed, a tight coherent fit is formed between the track 1010 and the support extrusion 1030, thereby minimizing movement of the track during use.

In some applications, a separate wedge 1042 is superior to a work piece having integral teeth because the process of extruding teeth protrusions can be delicate and lead to unacceptable waste.

In one aspect of the invention, the support extrusion 1030 comprises an outwardly-protruding alignment ridge 1050 extending along the length of the underside of the support extrusion 1030. The alignment ridge 1050 is configured to self-align with a slot 1060 of the base extrusion 1020 such that the assembly 1000 remains aligned when the assembly 1000 is coupled with the base extrusion 1020 (explained below).

Maintaining alignment between the track 1010 and the support extrusion 1020 is extremely important. However, as explained above, previous solutions require careful measuring, alignment, and drilling. Accordingly, self-alignment between the alignment ridge 1050 and the slot 1060 of the support extrusion 1020 provides a simple way to ensure parallel alignment of the two work pieces when assembling a track system. In some embodiments of the invention, the alignment ridge 1050 is narrower than the width of the slot 1060 of the support extrusion 1030, such that the alignment ridge 1050 can align with either side of the slot.

Figure 11A:
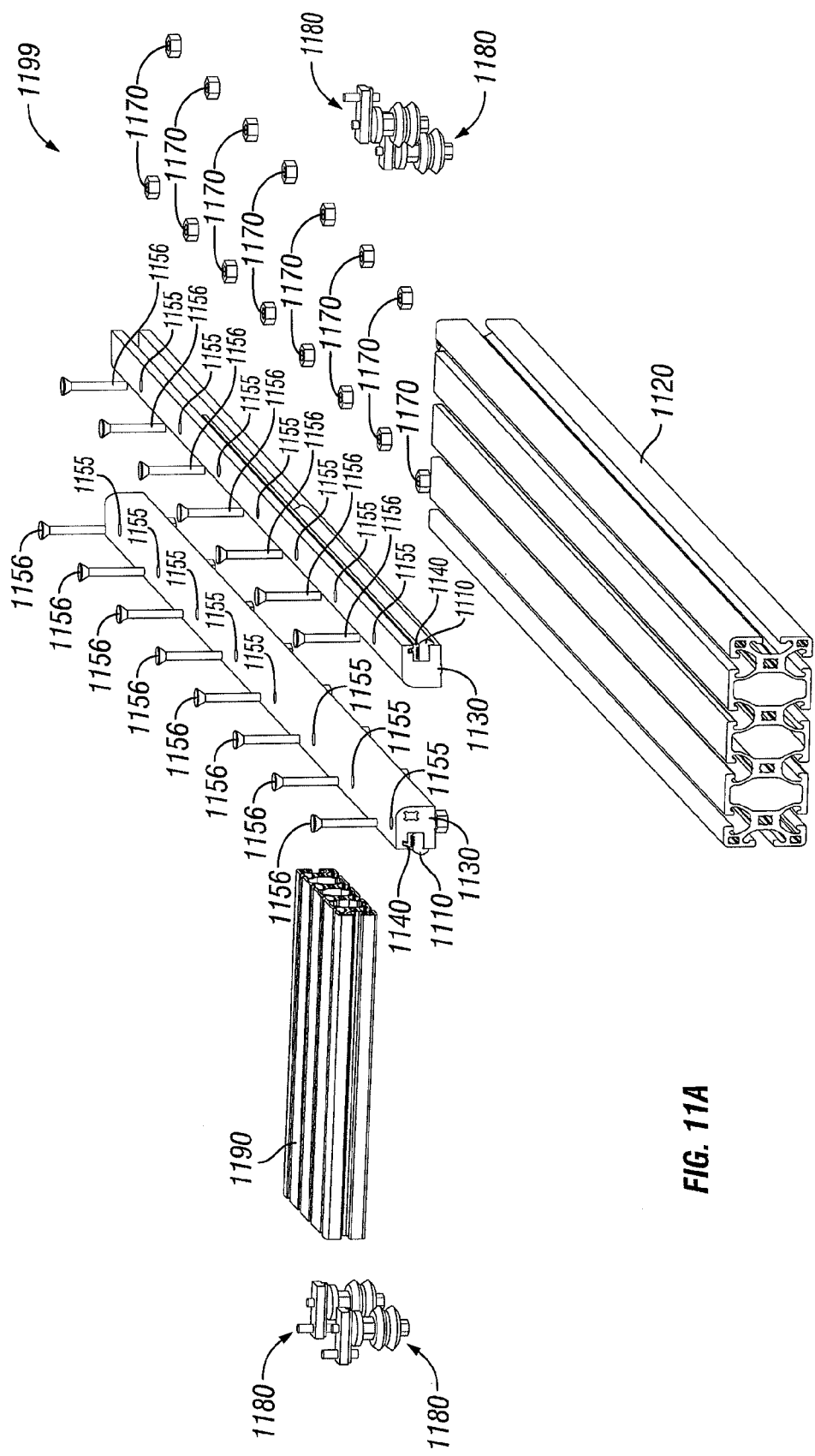
FIG. 11A is an exploded view of a track system using a support extrusion and wedge assembly to couple tracks to a base extrusion according to the invention.
Figure 11B:
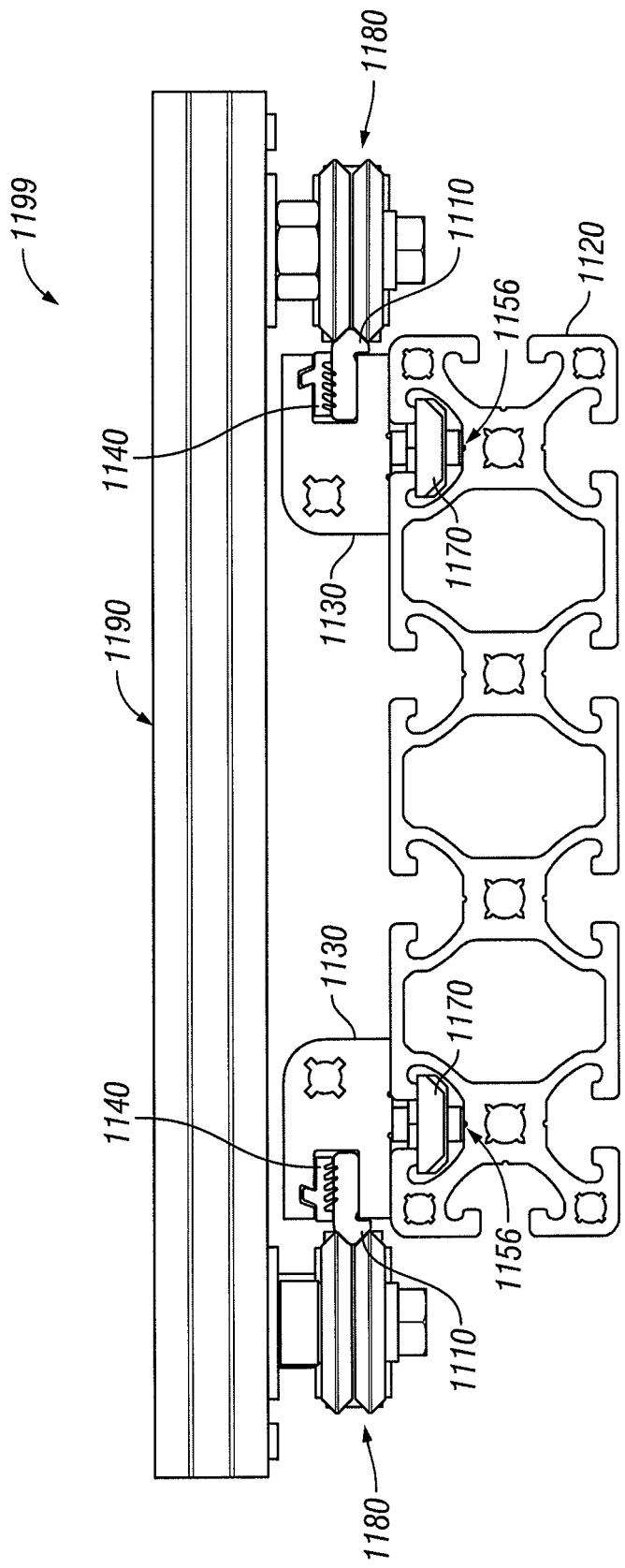
FIG. 11B illustrates an end view of the track system shown in FIG. 11A in an assembled configuration.
Figure 11C:
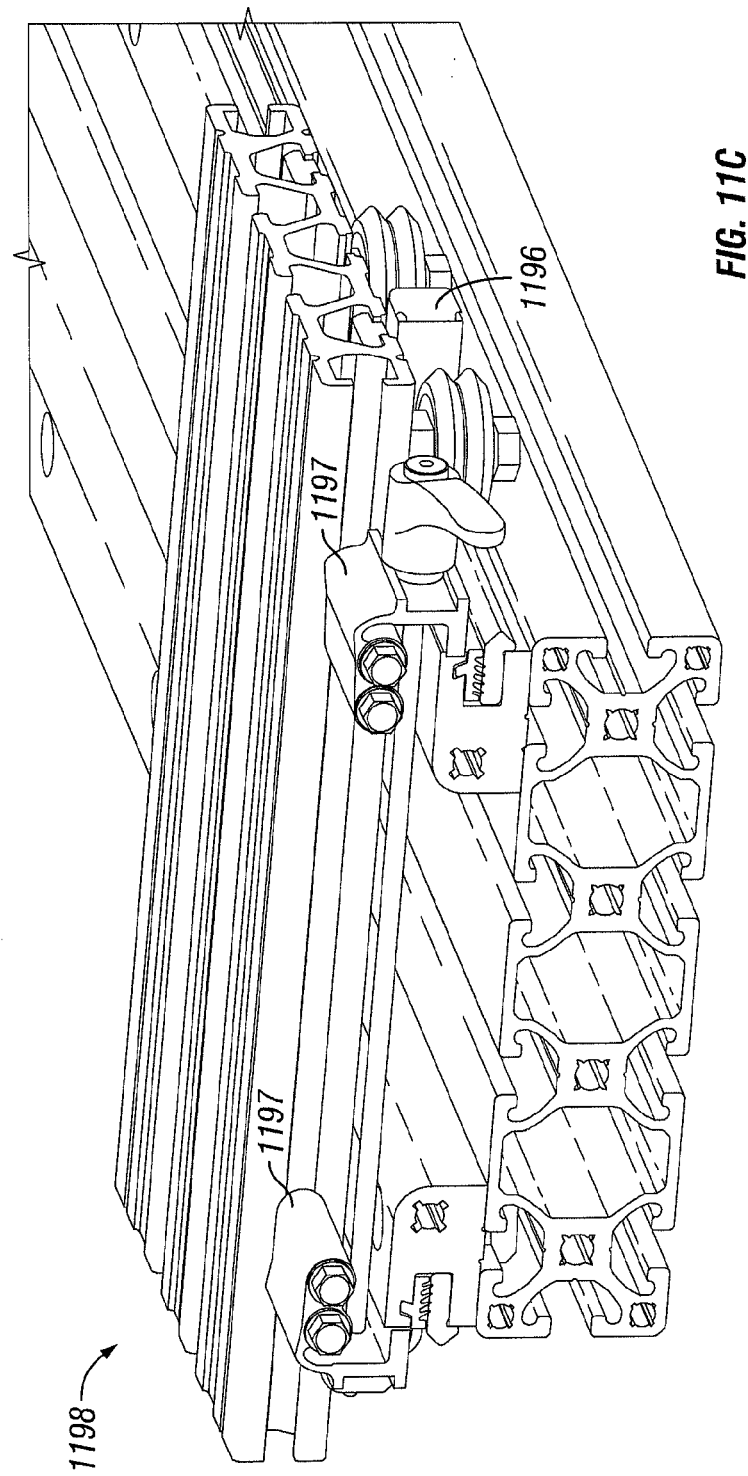
FIG. 11C is an upper isometric view of a track system similar to the embodiment shown in FIGS. 11A and 11B with brakes and wheel covers.
Figure 11D:
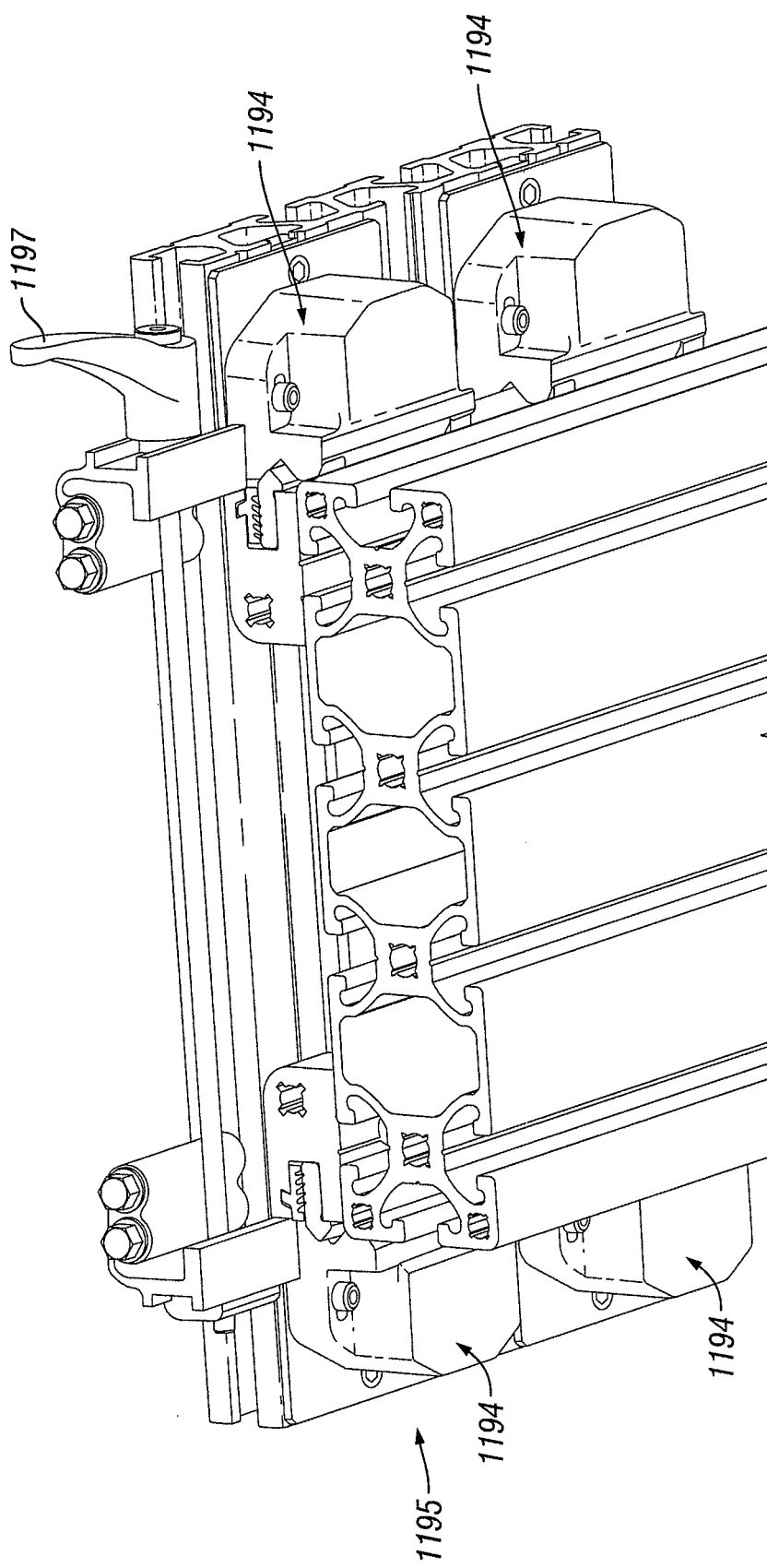
FIG. 11D is a lower isometric view of the track system shown in FIG. 11C.

With reference now to FIGS. 11A and 11B, two assemblies 1100 are formed by press-fitting tracks 1110 into support extrusions 1130 having wedges 1140. According to FIG. 11A, the support extrusion 1130 includes a series of conduits 1155 for accepting the insertion of a plurality of bolts 1156 therethrough. Likewise, each of the slots 1060 in the base extrusion 1120 is configured such that one or more T-nuts 1170 fit therein. Each slot 1060 is defined by an opening 1062 and a slot core 1064.

The assembled assemblies 1100 are aligned with a base extrusion 1120 and a plurality of T-nuts 1170 are inserted into one or more slots 1060 such that the T-nuts 1170 are captured in the slot cores 1064 as shown in FIG. 11B. Additionally, a plurality of guide wheels 1180 are aligned with the tracks 1110. Likewise, the plurality of guide wheels 1180 are configured to be coupled with a moveable extrusion 1190.

According to FIG. 11B, the bolts 1156 are inserted through the conduits and coupled with the T-nuts 1170, thereby securing the support extrusion 1130 with the base extrusion 1120. Likewise, the guide wheels 1180 are aligned with the tracks 1110 and, hence, with moveable extrusion 1190.

In some embodiments the track system described in FIGS. 11A and 11B include one or more of brakes, lubricators, and wheel covers. In some embodiments, the wheel covers 1194 include their own lubrication system with two lubricated felts per wheel cover.

Figure 11E:
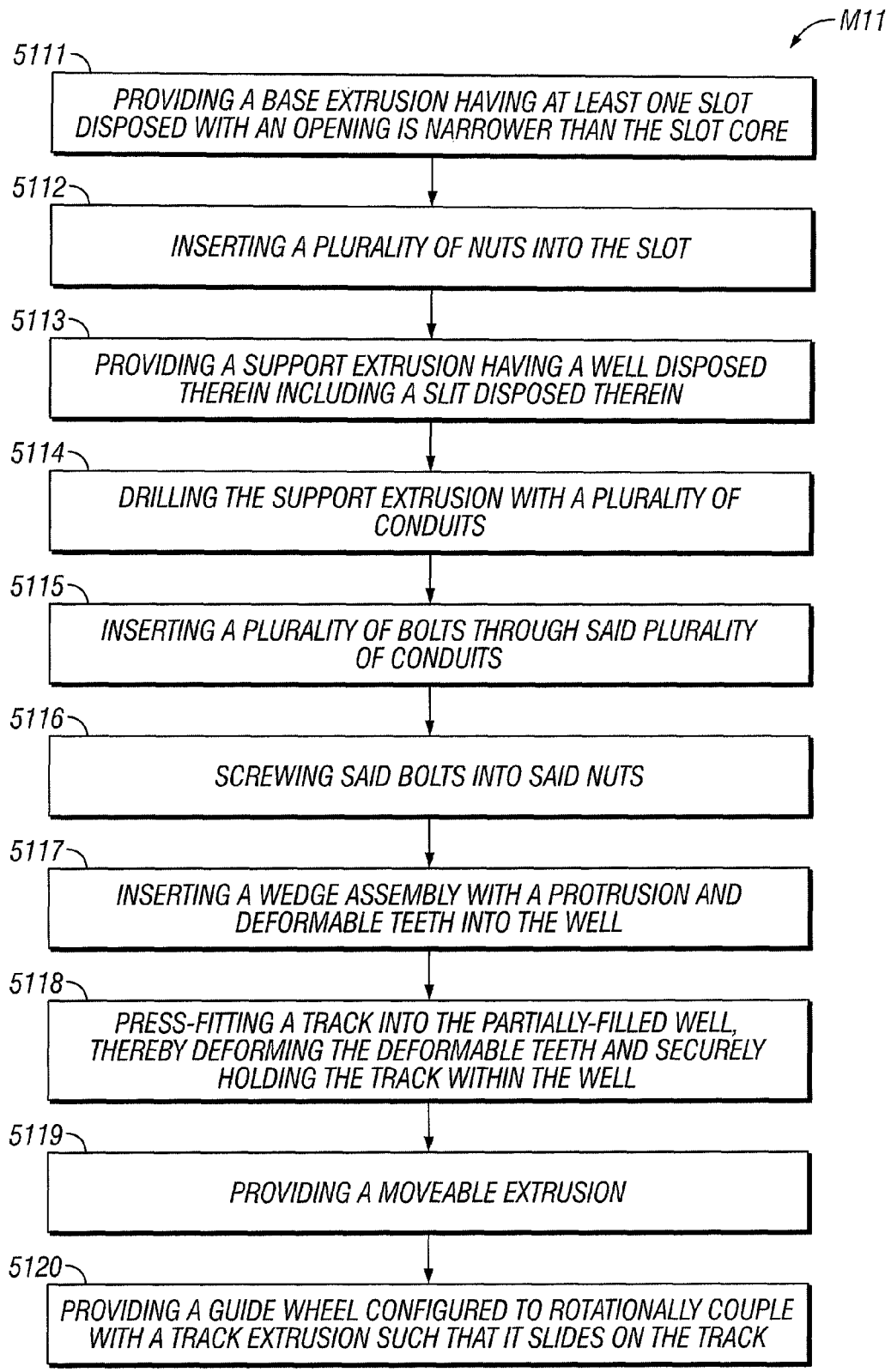
FIG. 11E is a flow chart showing the method steps involved in assembling a track with a base extrusion via a support extrusion and a wedge according to the invention.

Referring next to FIG. 11E, the method for assembling an assembly a track with a base extrusion via a support extrusion and a wedge according to some embodiments of the invention begins with providing a base extrusion having at least one slot disposed with an opening is narrower than the slot core at step S111. The method continues with inserting a plurality of nuts into the slot at step S112 and providing a support extrusion having a well disposed therein including a slit disposed therein at step S113.

The method continues with drilling the support extrusion with a plurality of conduits at step S114, inserting a plurality of bolts through said plurality of conduits at step S115, screwing said bolts into said nuts at step S116.

The method continues with inserting a wedge with a protrusion and deformable teeth into the well at step S117, press-fitting a track into the partially-filled well, thereby deforming the deformable teeth and securely holding the track within the well at step S118.

Next, the method involves providing a moveable extrusion at step S119 and providing at least one guide wheel configured to rotationally couple with the track extrusion such that the moveable extrusion moves with respect to the track at step S120.

Figure 12A:
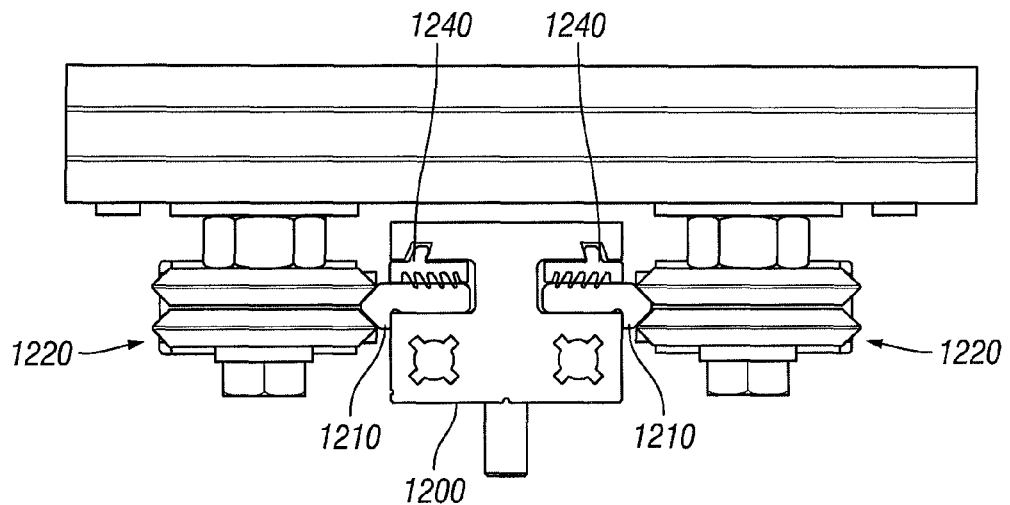
FIG. 12A is a side view of a double-edged support extrusion for coupling a track with a base extrusion via a wedge assembly according to the invention.
Figure 12B:
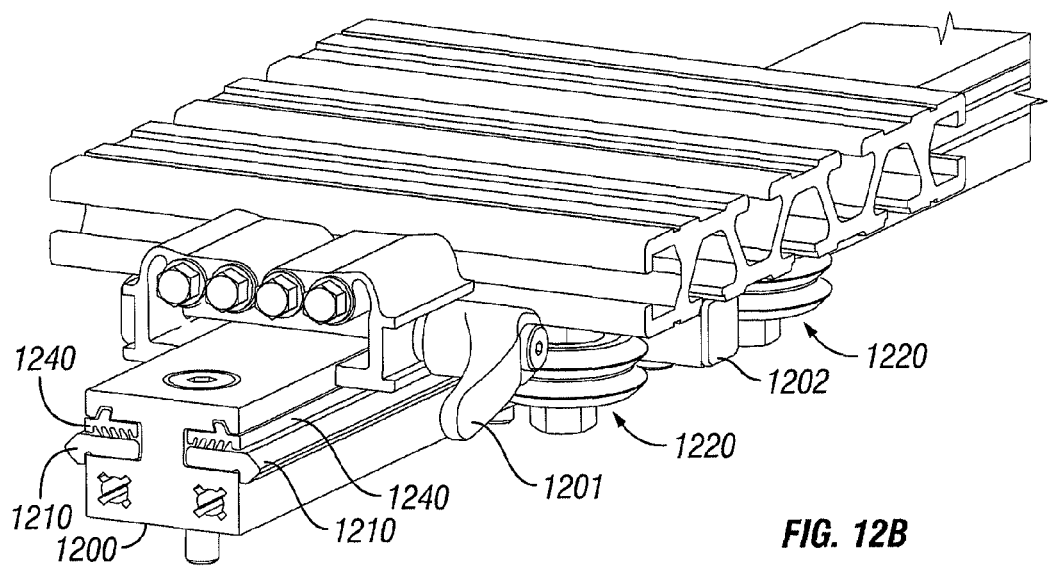
FIG. 12B is an upper isometric view of a double-edged support extrusion for coupling a track with a guide wheel via a wedge assembly and with brakes and lubricators according to the invention.

Some embodiments of the invention involve a double-edged support extrusion for coupling a track with a base extrusion via a wedge according to some embodiments of the invention. For example, FIG. 12A shows a double-edged support extrusion 1200 for coupling a track 1210 with a guide wheel 1220 via a wedge 1240. FIG. 12B shows a double-edged support extrusion 1200 for coupling a track 1210 with a guide wheel 1220 via a wedge 1240 having brakes 1201 and lubricators 1202.

In the illustrated embodiments of the invention, the track system comprises a coefficient of friction ranging from 0.005 to 0.02. Likewise, the track systems can be fully customized to the end-user's environment using carbon or stainless steel track, and carbon, or stainless steel wheels, or low temp, high temp, corrosion-resistant, or custom grease wheel versions.

The invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the invention could be implemented in several different ways and have several different appearances.

The invention claimed is:

1. A system for securing a linear motion guide track to a support extrusion comprising:
    the linear motion guide track having a track interface surface;
    a wedge having a first side, a second side opposite said first side, a protrusion on said first side, and a plurality of deformable teeth disposed on said second side;
    the support extrusion having at least one well including a slit configured to accept the protrusion of said wedge, insertion of said protrusion in said slit positioning said wedge in and partially filling said at least one well,
    wherein when said linear motion guide track is press-fitted into said partially-filled at least one well, said plurality of deformable teeth are deformed such that said linear motion guide track is securely held within said at least one well with at least a portion of said track interface surface protruding from said at least one well.

2. The system according to claim 1, wherein said support extrusion further comprises a plurality of conduits extending therethrough in a direction perpendicular to said support extrusion.

3. The system according to claim 2, further comprising a substantially planar base extrusion having at least one slot including an opening and a slot core, wherein said opening is narrower than said slot core.

4. The system according to claim 3, further comprising:
    a plurality of nuts inserted into said at least one slot and captured in said slot core; and
    a plurality of bolts inserted through said plurality of conduits,
    said plurality of nuts configured such that said nuts resist the application of an outward force on said plurality of nuts through their contact with said slot core of said opening,
    wherein screwing said plurality of bolts into said plurality of nuts creates an upward force on said nuts such that said resistance secures said support extrusion with said base extrusion.

5. The system according to claim 4, wherein said support extrusion further comprises an alignment ridge configured to align with at least one side of said opening, thereby ensuring that said support extrusion is disposed in parallel alignment with said base extrusion.

6. The system according to claim 3, further comprising:
    a moveable extrusion, and
    at least one guide wheel configured to rotationally couple with said track interface surface of said linear motion guide track, and further configured for coupling with said moveable extrusion such that said moveable extrusion moves with respect to said linear motion guide track.

7. The system according to claim 6, further comprising at least one brake coupled to said moveable extrusion configured to apply pressure to said linear motion guide track, thereby at least partially resisting said movement.

8. The system according to claim 6, further comprising at least one lubricator coupled to said moveable extrusion configured to lubricate said linear motion guide track.

9. The system according to claim 6, further comprising at least one wheel cover coupled to the at least one guide wheel.

10. The system according to claim 6, further comprising:
    at least one additional linear motion guide track having an additional track interface surface;
    at least one additional wedge having a first side, and a second side opposite said first side, an additional protrusion on said first side thereof; and at least one additional plurality of deformable teeth disposed on said second side;

at least one additional well disposed on an opposite side of said support extrusion from said at least one well including an additional slit configured to accept the at least one additional protrusion of said at least one additional wedge, insertion of said additional protrusion in said at least additional slit positioning said at least one additional wedge in and partially filling said at least one additional well, wherein when said at least one additional linear motion guide track is press-fitted into said partially-filled at least one additional well said at least one additional plurality of deformable teeth are deformed such that said at least one additional linear motion guide track is securely held within said at least one additional well with at least a portion of said at least one additional track interface surface protruding from said at least one additional well.

11. A method of securing a linear motion guide track to a support extrusion comprising:

providing a support extrusion having at least one well including a slit;

inserting a wedge into said at least one well, thereby partially filling said at least one well, said wedge having a first side, a second side opposite said first side, a protrusion on said first side; and a plurality of deformable teeth disposed on said second side, the slit of said at least one well configured to accept the protrusion of said wedge, press-fitting a linear motion guide track into said at least one partially-filled well, said linear motion guide track having a track interface surface, thereby deforming said plurality of deformable teeth such that said linear motion guide track is securely held within said at least one well, and wherein at least a portion of said track interface surface protrudes from said at least one well upon said press-fitting.

12. The method according to claim 11, further comprising drilling said support extrusion with a plurality of conduits extending therethrough in a direction perpendicular to said support extrusion.

13. The method according to claim 12, further comprising:
providing a substantially planar base extrusion at least one slot having an opening and a slot core, wherein said opening is narrower than said slot core.

14. The method according to claim 13, further comprising:
inserting a plurality of nuts into said at least one slot, wherein said plurality of nuts are configured such that said plurality nuts resist the application of an outward force on said nuts through their contact with the core-side of said opening, and
inserting a plurality of bolts through said plurality of conduits,
screwing said plurality of bolts into said plurality of nuts, thereby creating an upward force on said nuts such that said resistance secures said support extrusion with said base extrusion.

15. The method according to claim 14, further comprising providing an alignment ridge on said support extrusion, said alignment ridge extending along the length of said support extrusion, wherein said alignment ridge is configured to align with at least one side of said opening, thereby ensuring that said support extrusion is in parallel alignment with said base extrusion.

16. The method according to claim 13, further comprising:
providing a moveable extrusion; and
providing at least one guide wheel configured to rotationally couple with said track interface surface of said linear motion guide track, and further configured for coupling with said moveable extrusion such that said moveable extrusion sides moves with respect to said linear motion guide track.

17. The method according to claim 16, further comprising coupling at least one brake to said moveable extrusion, wherein said at least one brake is configured to apply pressure to said linear motion guide track, thereby at least partially resisting said sliding.

18. The method according to claim 16, further comprising coupling at least one lubricator to said moveable extrusion, wherein said lubricator is configured to lubricate said linear motion guide track.

19. The method according to claim 16 further comprising coupling at least one wheel cover to said guide wheel.

* * * * *